(12) United States Patent
Ito et al.

(10) Patent No.: US 7,974,751 B2
(45) Date of Patent: Jul. 5, 2011

(54) SENSITIVITY IDENTIFYING DEVICE AND STEERING ASSIST SYSTEM

(75) Inventors: Hideaki Ito, Nara (JP); Fuminori Ozaki, Kizugawa (JP); Yumi Tsutsumi, Yawata (JP); Mayumi Komatsu, Kyoto (JP); Shinichi Kuratani, Kasugai (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 1120 days.

(21) Appl. No.: 11/786,087

(22) Filed: Apr. 10, 2007

(65) Prior Publication Data
US 2007/0250234 A1    Oct. 25, 2007

(30) Foreign Application Priority Data
Apr. 10, 2006 (JP) .................. 2006-108074

(51) Int. Cl.
*B62D 6/00* (2006.01)
(52) U.S. Cl. .......................... 701/41; 701/42
(58) Field of Classification Search .............. 701/41, 701/42; 180/410, 446
See application file for complete search history.

(56) References Cited

U.S. PATENT DOCUMENTS

| | | | | | |
|---|---|---|---|---|---|
| 5,487,007 | A | * | 1/1996 | Suzuki et al. ................. | 701/44 |
| 5,668,722 | A | * | 9/1997 | Kaufmann et al. ............ | 701/41 |
| 2002/0087241 | A1 | * | 7/2002 | Nakano et al. ................ | 701/41 |
| 2002/0143449 | A1 | * | 10/2002 | Yasuda ......................... | 701/41 |
| 2003/0220727 | A1 | * | 11/2003 | Husain et al. ................. | 701/41 |
| 2004/0073345 | A1 | * | 4/2004 | Mukai et al. .................. | 701/41 |
| 2004/0088093 | A1 | * | 5/2004 | Yao et al. ...................... | 701/44 |
| 2004/0148080 | A1 | * | 7/2004 | Ekmark et al. ................ | 701/41 |
| 2004/0162655 | A1 | * | 8/2004 | Patankar ....................... | 701/41 |
| 2005/0065685 | A1 | * | 3/2005 | Hamamoto et al. ........... | 701/41 |
| 2005/0140322 | A1 | | 6/2005 | Itakura | |
| 2006/0006021 | A1 | * | 1/2006 | Takimoto et al. ............. | 180/446 |
| 2006/0080016 | A1 | * | 4/2006 | Kasahara et al. .............. | 701/41 |
| 2007/0062755 | A1 | * | 3/2007 | Krieger et al. ................ | 180/446 |
| 2007/0168093 | A1 | * | 7/2007 | Nishiyama .................... | 701/41 |

(Continued)

FOREIGN PATENT DOCUMENTS
EP    1 316 494 A1    6/2003
(Continued)

OTHER PUBLICATIONS

European Search Report for application No. 07105897.8-1523, dated Apr. 4, 2009, 7 pages.

(Continued)

*Primary Examiner* — Khoi Tran
*Assistant Examiner* — Brian J Broadhead
(74) *Attorney, Agent, or Firm* — Osha • Liang LLP

(57) ABSTRACT

A sensitivity identifying device has an operating object device configured to operate when an operation member is moved according to a force applied by a user, an assist force applying device for applying an assist force to movement of the operation member, an operation force parameter detecting device for detecting a value of an operation force parameter, an operation response parameter detecting device for detecting a value of an operation response parameter, a sensitivity identifying information storage section for storing sensitivity identifying information associating a sensitivity index, with a combination of the value of the operation force parameter and the operation response parameter, and a sensitivity determining unit for specifying the sensitivity index based on the combination of the value of the operation force parameter and the operation response parameter, and the sensitivity identifying information, and outputting the sensitivity index.

14 Claims, 17 Drawing Sheets

U.S. PATENT DOCUMENTS

| | | | | |
|---|---|---|---|---|
| 2007/0250234 A1* | 10/2007 | Ito et al. | ........................... | 701/41 |
| 2008/0004772 A1* | 1/2008 | Kobayashi | ...................... | 701/41 |
| 2008/0073144 A1* | 3/2008 | Takeuchi et al. | .............. | 180/446 |
| 2009/0192680 A1* | 7/2009 | Moeller | .......................... | 701/42 |
| 2009/0254253 A1* | 10/2009 | Ghoneim et al. | ............... | 701/42 |
| 2009/0312909 A1* | 12/2009 | Onuma | ........................... | 701/41 |
| 2010/0023216 A1* | 1/2010 | Huang et al. | ..................... | 701/42 |
| 2010/0100284 A1* | 4/2010 | Kudo et al. | ..................... | 701/42 |

FOREIGN PATENT DOCUMENTS

| | | |
|---|---|---|
| JP | 5-77750 | 3/1993 |
| JP | 6-297983 | 10/1994 |
| JP | 7-156817 | 6/1995 |
| JP | 8-115102 | 5/1996 |
| JP | 8-161004 | 6/1996 |
| JP | 2002-214083 | 7/2002 |
| JP | 2003-81119 A | 3/2003 |
| WO | WO 03/084799 | 10/2003 |

OTHER PUBLICATIONS

English Patent Abstracts of Japan from the European Patent Office for Japanese patent application with publication No. 2003081119, Publication Date: Mar. 19, 2003, 1 page.

Patent Abstracts of Japan, Publication No. 06-297983, Publication Date: Oct. 25, 1994, 157 pages.

Patent Abstracts of Japan, Publication No. 05-077750, Publication Date: Mar. 30, 1993, 10 pages.

Patent Abstracts of Japan, Publication No. 07-156817, Publication Date: Jun. 20, 1995, 32 pages.

Patent Abstracts of Japan, Publication No. 08-161004, Publication Date: Jun. 21, 1996, 11 pages.

Patent Abstracts of Japan, Publication No. 08-115102, Publication Date: May 7, 1996, 31 pages.

Patent Abstracts of Japan, Publication No. 2002-214083, Publication Date: Jul. 31, 2002, 29 pages.

Communication Pursuant to Article 94(3) EPC in European Application No. 07 105 897.8 dated Nov. 10, 2010 (3 pages).

* cited by examiner

Fig. 17A Smoothness
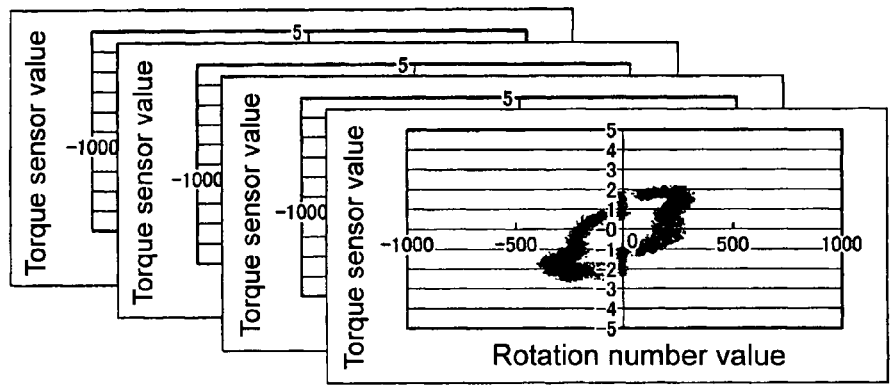
Fig. 17B Rigidity
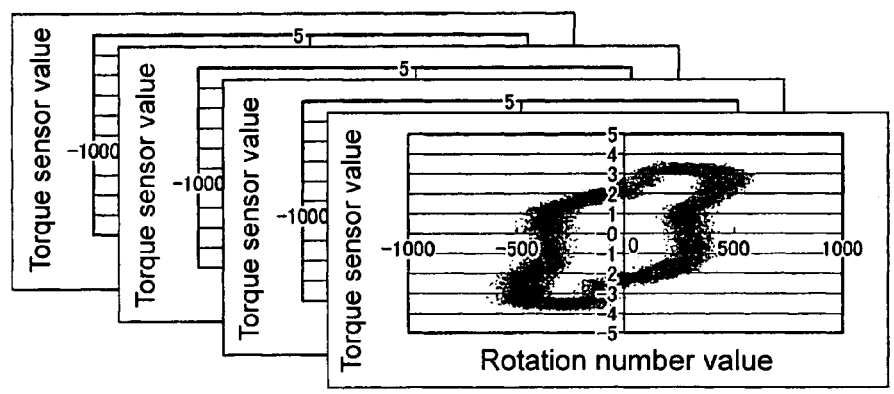
Fig. 17C Rapid response
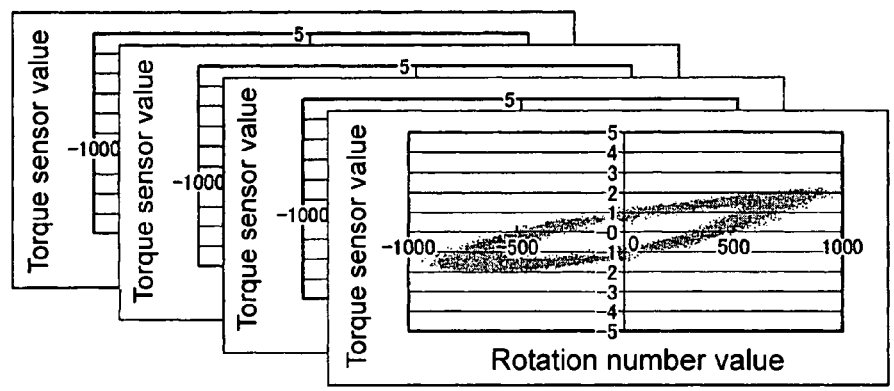

SENSITIVITY IDENTIFYING DEVICE AND STEERING ASSIST SYSTEM

BACKGROUND OF THE INVENTION

1. Field of the Invention

The present invention relates to an operation system including an operating object device that operates when an operation member moves according to the force applied by a user, and an assist force applying device for applying assist force to the movement of the operation member such as an electrically operated power steering system.

2. Description of the Related Art

Power steering systems are commonly used in automobiles. Conventional power steering systems use hydraulic force to assist the rotation of the steering wheel when steering the automobile. The driver is able to steer with a lighter force with help of the power steering system.

Recently, the use of electrically operated power steering systems referred to as EPS (Electric Power Steering) has been widely spreading. Steering in many automobiles have begun to change from hydraulic power steering systems to the EPS. The EPS has the following advantages compared with the hydraulic power steering system:

(1) fuel consumption is improved due to light-weighted component;
(2) safe steering control can be actively performed by electrical control;
(3) EPS can be incorporated in one part of a system for comprehensively controlling each part of the automobile.

Japanese Patent No. 3410512 (issued May 26, 2003) discloses a method of controlling the EPS.

Japanese Patent No. 3410512 discloses a configuration including an IC card reading unit for inputting characteristic information created by a simulation device that creates the characteristic information controlling the characteristics of the automobile outside the target automobile to the target automobile, and a main computer unit for changing the characteristics of the target automobile based on the characteristic information from the reading unit.

Since the characteristics of the target automobile are set outside, the configuration of Japanese Patent No. 3410512 can set the desired characteristics that agree with the sensitivity of the driver while keeping the equipment of the target automobile simple.

Furthermore, Japanese Patent No. 3222506 (issued Oct. 29, 2001) discloses an electrically operated power steering device including a step of reading an output signal from a steering angle sensor, a step of reading a signal from a vehicle speed sensor, a step of calculating a steering angular speed according to the steering angle, a step of storing the vehicle speed and the steering angular speed, a timer processing step of repeating each step over a predetermined number of times for a predetermined time, a step of deleting the upper limit and lower limit ranges of the data repeated over a predetermined number of times, a step of calculating the average vehicle speed and the average steering angular speed from the remaining data, and a step of determining the characteristics of the driver from the average speed and the average steering angular speed.

Furthermore, Japanese Patent Application Laid-Open No. 07-156817 (Jun. 20, 1995) discloses the following electrically operated power steering device. The electrically operated power steering device is configured by a steering torque sensor, a steering rotational speed sensor, a controlling unit, an electrical motor driving unit and an electrical motor. The controlling unit calculates a correction value of the product of a torque attenuation coefficient corresponding to a torque signal and a rotational speed control amount corresponding to the steering rotational speed signal, and generates an electrical motor control signal subtracted or added between the torque control amount corresponding to the torque signal and the correction value in correspondence to going state or returning state of the steering.

Japanese Patent Application Laid-Open No. 08-161004 (Jun. 21, 1996) and Japanese Patent Application Laid-Open No. 08-115102 (May 7, 1996) also disclose background art, although not described in detail herein.

SUMMARY

One or more embodiments of the present invention provides one or more of a sensitivity identifying device for accurately recognizing the operation feeling felt by the user, an assist force controlling device, an assist force setting device, a sensitivity identifying method, an assist force control method, an assist force setting method, a sensitivity identifying program, an assist force control program, and an assist force setting program in an operation system including an operating object device that operates when an operation member moves according to the force applied by a user, and an assist force applying device for applying assist force to the movement of the operation member.

In one or more embodiments of the present invention, a sensitivity identifying device has a configuration including an operating object device operated when an operation member is moved according to a force applied by a user, an assist force applying device for applying assist force to the movement of the operation member, a sensitivity identifying information storage section for storing sensitivity identifying information associating the sensitivity index with a combination of a value of an operation force parameter indicating the force applied to the operation member from the user and a value of an operation response parameter indicating the condition in which the assist force applying device is operated according to the operation by the user, an operation force parameter detecting device for detecting the value of the operation force parameter, an operation response parameter detecting device for detecting the value of the operation response parameter, and a sensitivity determining unit for specifying the sensitivity index based on the combination of the value of the operation force parameter detected by the operation force parameter detecting device and the value of the operation response parameter detected by the operation response parameter detecting device and the sensitivity identifying information, and outputting the sensitivity index.

In one or more embodiments of the present invention, a sensitivity identifying method includes the steps of storing, in advance, sensitivity identifying information associating the sensitivity index with respect to a combination of a value of an operation force parameter indicating the force applied to the operation member from the user and a value of an operation response parameter indicating a condition in which an assist force applying device is operated according to the operation of the user in a sensitivity identifying information storage section, detecting the value of the operation force parameter indicating the force applied to the operation member from the user, detecting the value of the operation response parameter indicating the condition in which the assist force applying device is operated according to the operation of the user, reading the sensitivity index corresponding to the combination of the value of the detected operation force parameter and the value of the operation response parameter from the sensitivity identifying information storage section, and outputting the sensitivity index.

In one or more embodiments of the present invention, the sensitivity identifying device may be a configuration in which the operating object device is a steering device arranged in an automobile, and an automobile, the operation member is a steering wheel arranged in the steering device, and the assist force applying device is an assist motor for applying the assist force to the steering device with the rotation of the steering wheel in the above configuration.

In one or more embodiments of the present invention, in the sensitivity identifying device, there is a plurality of operation force parameters, a plurality of operation response parameters, and at least one of each parameter is combined.

In a sensitivity identifying device according to one or more embodiments of the present invention, the sensitivity identifying information is a sensitivity identifying map in which a plurality of two dimensional maps, each having a sensitivity region corresponding to each sensitivity index set in a two dimensional space having the operation force parameter and the operation response parameter as axes, for each value of a specific operating condition parameter indicating the operating condition in the operating object device, regarding the above configuration.

In a sensitivity identifying device according to one or more embodiments of the present invention, the operating object device is a steering device arranged in an automobile, the operation member is a steering wheel arranged in the steering device, the assist force applying device is an assist motor for applying the assist force to the steering device with the rotation of the steering wheel, the operation force parameter corresponding to one axis of the two dimensional map is a torque value indicating the torque applied to the steering device with the rotation of the steering wheel, the operation response parameter corresponding to the other axis of the two dimensional map is a rotation number value of the assist motor, and the two dimensional map is arranged for every vehicle speed value indicating the speed of the automobile, regarding the above configuration.

In one or more embodiments of the present invention, the assist force controlling device is arranged in an operation system including an operating object device operated when an operation member is moved according to a force applied by a user, an assist force applying device for applying an assist force to the movement of the operation member, and the sensitivity identifying device according to the present invention as described above, for controlling the assist force applied by the assist force applying device, the assist force controlling device including an assist force setting information storage section for storing a correspondence relationship of the sensitivity index and assist force setting information for setting the magnitude of the assist force, and an assist controlling unit for reading the assist force setting information corresponding to the sensitivity index received from the sensitivity identifying device from the assist force setting information storage section, and controlling the assist force applying device based on the read assist force setting information.

In an assist force controlling device according to one or more embodiments of the present invention, the assist force setting information may be information indicating the relationship between the value of a specific operating condition parameter indicating the operating condition in the operating object device and the assist force, and the assist force controlling unit may transmit the assist force setting information to an assist force setting device for setting the assist force of the assist force applying device regarding the above configuration.

In the assist force controlling device according to one or more embodiments of the present invention, the operating object device is a steering device arranged in an automobile, the operation member is a steering wheel arranged in the steering device, the assist force applying device is an assist motor for applying the assist force to the steering device with the rotation of the steering wheel, and the assist force setting information is information indicating the relationship of at least one of a torque value indicating the torque applied to the steering device, a rotation number value of the assist motor or a vehicle speed value indicating the speed of the automobile with the rotation of the steering wheel and the assist force regarding the above configuration.

In an assist force controlling device according to one or more embodiments of the present invention, the assist force setting information may be arranged for each type of a plurality of operation modes set in advance, and the assist force controlling unit may receive specifying information of the operation mode specified by the user from an operation mode setting device for accepting command input specifying the operation mode from the user, and may control the assist force applying device based on the assist force setting information corresponding to the received specifying information regarding the above configuration.

In one or more embodiments of the present invention, an assist force setting device is a device for receiving assist force setting information from the assist force controlling device and setting the assist force of the assist force applying device based on the assist force setting information, the assist force setting device including an assist force setting information storage section for storing the assist force setting information received from the assist force controlling device, and an assist force setting unit for outputting an assist force set value for setting the assist force of the assist force applying device to the assist force applying device based on the value of at least one operating condition parameter received from an operating condition parameter detecting device for detecting the value of the specific operating condition parameter and the assist force setting information.

In an assist force setting device according to one or more embodiments of the present invention, the assist force setting unit may change the value from an assist force set value before change to an assist force set value after change over a time of longer than or equal to 100 msec from the start of change when changing the assist force set value, regarding the above configuration.

A steering assist system according to one or more embodiments of the present invention includes a steering device operated when a steering wheel is moved according to the force applied from the user, an assist motor for applying assist force to the movement of the operation member, a sensitivity identifying information storage section for storing sensitivity identifying information associating the sensitivity index with a combination of a value of an operation force parameter indicating the force applied to the steering wheel from the user and a value of an operation response parameter indicating the condition in which the assist motor is operated according to the operation by the user, an operation force parameter detecting device for detecting the value of the operation force parameter, an operation response parameter detecting device for detecting the value of the operation response parameter, a sensitivity determining unit for specifying the sensitivity index based on the combination of the value of the operation force parameter detected by the operation force parameter detecting device and the value of the operation response parameter detected by the operation response parameter detecting device and the sensitivity identifying information, and outputting the sensitivity index, an assist force setting information storage section for storing a correspondence relationship of the sensitivity index and assist force setting information for setting the magnitude of the assist force, an assist force controlling unit for reading the assist force setting information corresponding to the sensitivity index specified by the sensitivity determining unit from the assist force setting information storage section, and controlling the assist force applying device based on the read assist force setting information, and an assist force setting unit for outputting an assist force set value for setting the assist force of the assist force applying device to the assist motor based on the value of at least one parameter of the operation force parameter or the operation response parameter and the assist force setting information.

The sensitivity identifying device may be realized by a computer, in which case, the sensitivity identifying program for realizing the sensitivity identifying device on a computer by operating the computer as the above-described units is also encompassed within the scope of the present invention.

BRIEF DESCRIPTION OF THE DRAWINGS

FIG. 17A to FIG. 17C show views showing experiment data of the torque sensor value and the rotation number value of when the user or the driver feels a specific steering feeling;

DETAILED DESCRIPTION

In conventional EPS systems, because of the assist force being supplied by the rotational force of the assist motor in EPS, the EPS can cause the user tends to feel uncomfortable in steering compared to the hydraulic power steering system.

In Japanese Patent No. 3410512, a configuration of controlling the steering force based on characteristic information created by the simulation device is described. However, a method of recognizing the steering feeling felt by the user is not clearly described. The control that accurately responds to the steering feeling felt by the user cannot be performed even if the control as described is performed. The uncomfortable feeling of the user is thereby not completely suppressed.

In Japanese Patent No. 3222506, a configuration of determining the characteristics of the driver based on the output signal from the steering angle sensor and the signal from the vehicle speed sensor is described. However, the characteristics of the driver are only determined as being sporty, standard or mild. That is, the uncomfortable feeling of the user cannot be completely suppressed, similar to Japanese Patent No. 3410512.

Japanese Patent Application Laid-Open No. 07-156817, discloses control of the assist force according to the output of the steering torque sensor and the steering rotational speed sensor. However, only the calculation of the correction amount of the assist force based on the product of the output value of the steering torque sensor and the output value of the steering rotational speed sensor is being performed in Japanese Patent Application Laid-Open No. 07-156817. That is, the steering feeling felt by the user is not specified and assist control is not performed accordingly, and thus the uncomfortable feeling of the user cannot be completely suppressed, similar to Japanese Patent No. 3410512 and Japanese Patent No. 3222506.

Several embodiments according to the present invention will now be described with reference to the drawings. A steering assist system (operation system) 1 according to a present embodiment is mounted on an automobile, to perform the steering operation of the automobile. The type of automobile is not particularly limited. The type of automobile may be of any type of cars as long the driver controls the steering of the automobile, in other words, the car does not travel on fixed rails.

(Configuration of Steering Assist System)

Figure 2:
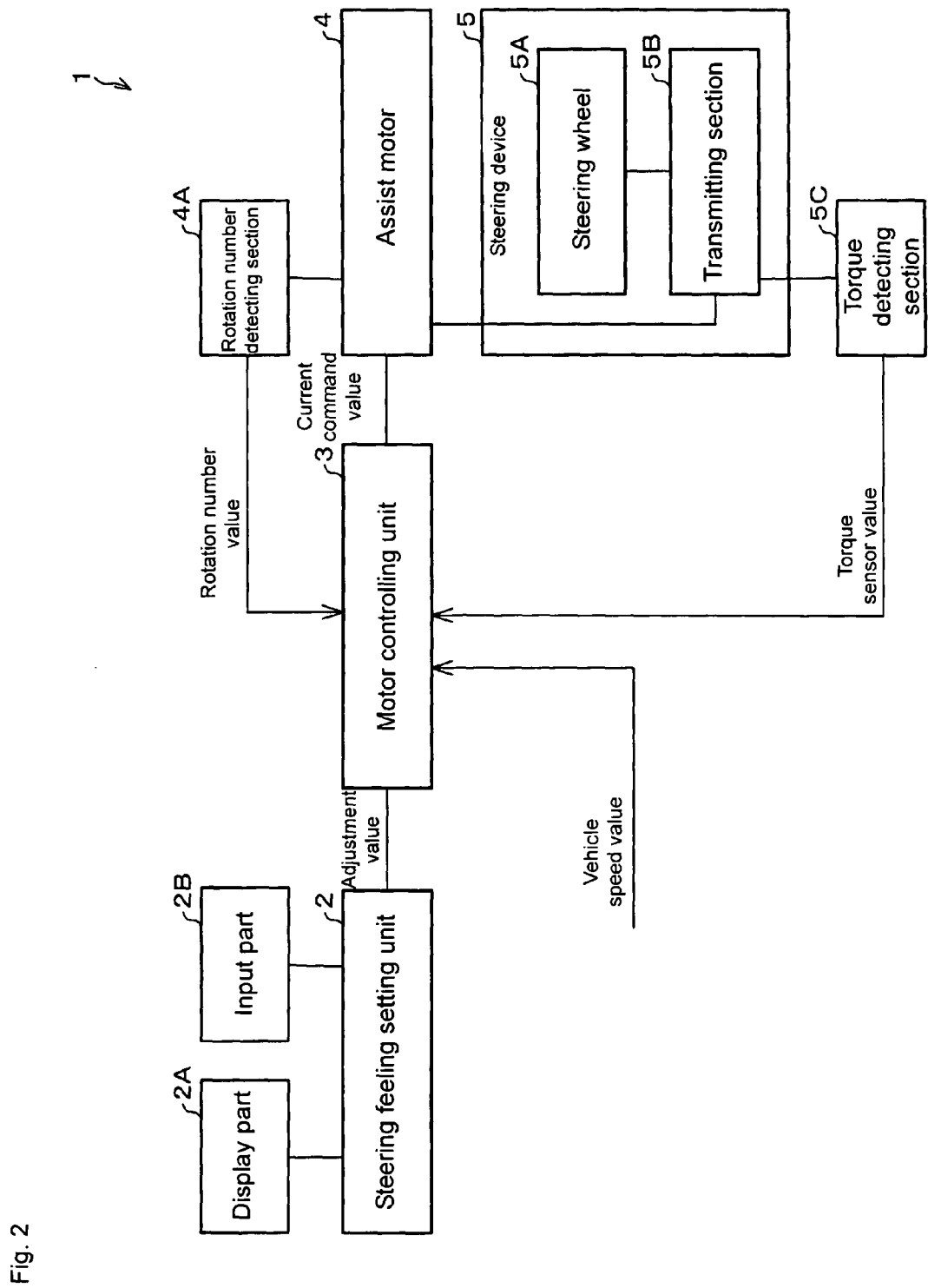
FIG. 2 shows a block diagram showing a schematic configuration of a steering assist system according to an embodiment of the present invention.

FIG. 2 is a block diagram showing a schematic configuration of the steering assist system 1 according to a present embodiment. As shown in the figure, the steering assist system 1 has a configuration including a steering feeling setting unit (operation mode setting device) 2, a motor controlling unit 3, an assist motor 4, and a steering device 5.

The steering device 5 is a device for steering the automobile through the operation of the user. The steering operation by the steering device 5 changes the orientation of the front wheel and/or back wheel of the automobile to change the traveling direction of the automobile. The steering device 5 includes a steering wheel 5A for receiving the rotational drive by the user, a transmitting section 5B for transmitting the rotation of the steering wheel 5A to the part for changing the orientation of the front wheel and/or back wheel of the automobile, and a torque detecting section (operation force parameter detecting device) 5C for detecting the rotational torque in the transmitting section 5B.

The assist motor 4 acts as a motor for supplying the power that assists the rotational driving force of the steering wheel 5A to the transmitting section in order to lighten the steering operation by the user. That is, the steering assist system 1 of the present embodiment assists the steering through EPS (Electric Power Steering) method. A rotation number detecting section (operation response parameter detecting device) 4A for detecting the rotation number of the assist motor 4 is arranged in the assist motor 4.

The rotating number detecting section 4A estimates the rotation number based on a terminal voltage value of the assist motor 4 and the current value flowing to the assist motor 4. The assist motor 4 assists the rotational driving force of the steering wheel 5A, as described above. However, the assist motor 4 is not limited thereto. The assist motor 4 is also applicable to a rack assist type or a pinion assist type.

The steering feeling setting unit 2 performs the process of setting an adjustment value of the steering feeling based on the command input from the user. The adjustment value set by the steering feeling setting unit 2 is transmitted to the motor controlling unit 3. A display part 2A and an input part 2B are arranged in the steering feeling setting unit 2. The display part 2A displays a display screen, which is used in the steering feeling setting process by the steering feeling setting unit 2. The display part 2A can be, for example, configured by a flat panel display and the like such as a liquid crystal display device. The input part 2B accepts the command input from the user. The input part 2B can include various keys and buttons, touch panel arranged on the display part 2A or the like. The input part 2B may also be a voice recognition device that accepts the command from the user through voice input.

The steering feeling setting unit 2 may be one application executed by a terminal device of a car navigation system. In this case, the display part 2A and the input part 2B become the display part and the input part in the terminal device of the car navigation system.

The motor controlling unit 3 controls the assist force on the transmitting section 5B by the assist motor 4. The control by the motor controlling unit 3 is performed based on the adjustment value received from the steering feeling setting unit 2, a vehicle speed value received from a vehicle speed detecting section (not shown) indicating the speed of the automobile at the relevant point in time, a rotation number value of the assist motor 4 received from the rotation number detecting section 4A, and a torque sensor value (torque value) received from the torque detecting section 5C. The motor controlling unit 3 controls the assist force by controlling the amount of drive current to be supplied to the assist motor 4. The motor controlling unit 3 is configured by a microcomputer referred to as ECU (Electronic Control unit). However, the motor controlling unit 3 is not limited thereto. The motor controlling unit 3 may be realized by a specific application in a computer system (e.g., car navigation system, automotive control general-purpose computer system etc.) used in other applications.

(Configuration of Steering Feeling Setting Unit)

Figure 3:
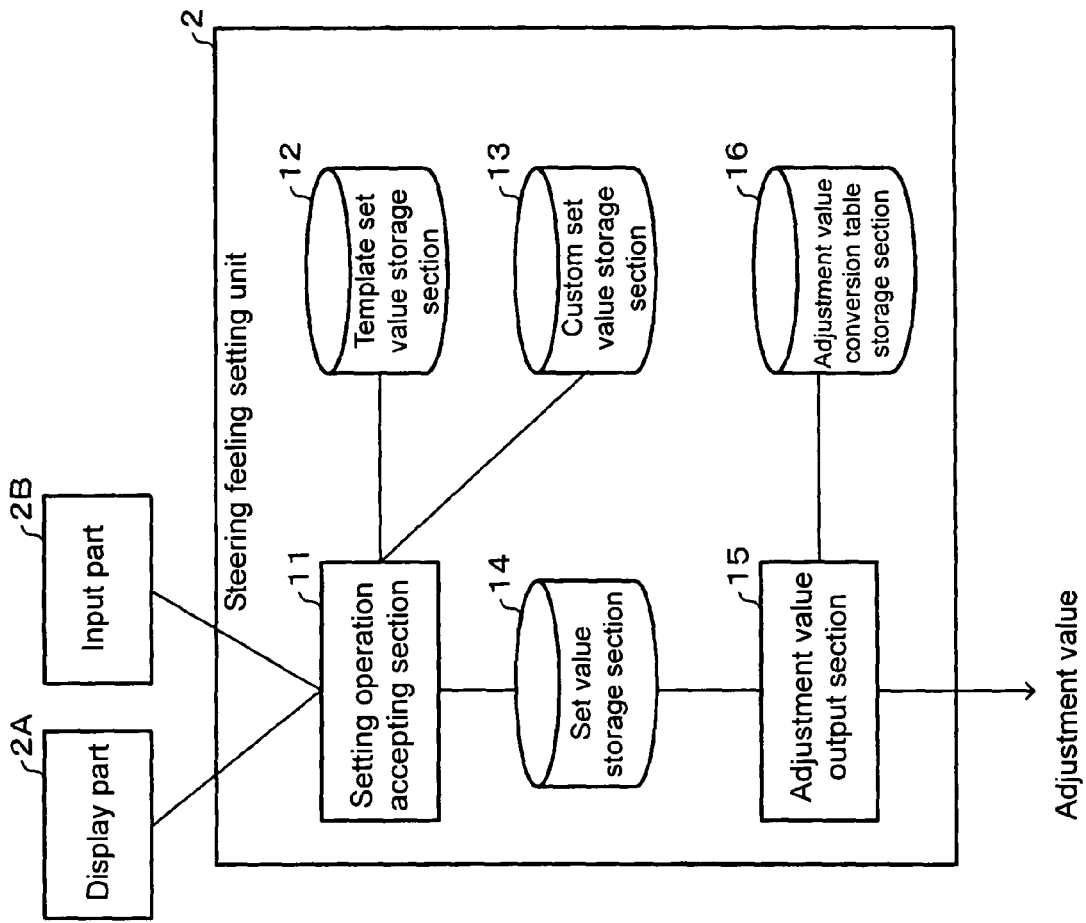
FIG. 3 shows a block diagram showing a schematic configuration of a steering feeling setting unit of a steering assist system according to an embodiment of the present invention.

The configuration of the steering feeling setting unit 2 will now be described with reference to FIG. 3. As shown in FIG. 3, the steering feeling setting unit 2 includes a setting operation accepting section 11, a template set value storage section 12, a custom set value storage section 13, a set value storage section 14, an adjustment value output section 15, and an adjustment value conversion table storage section 16.

The setting operation accepting section 11 accepts the setting operation serving as a command input by the user related to the setting process of the steering feeling. Specifically, the setting operation accepting section 11 performs control to display a display screen (setting operation screen) for accepting the setting operation on the display part 2A. The setting accepting section 11 accepts the command input from the user on the setting operation screen from the input part 2B.

Figure 4:
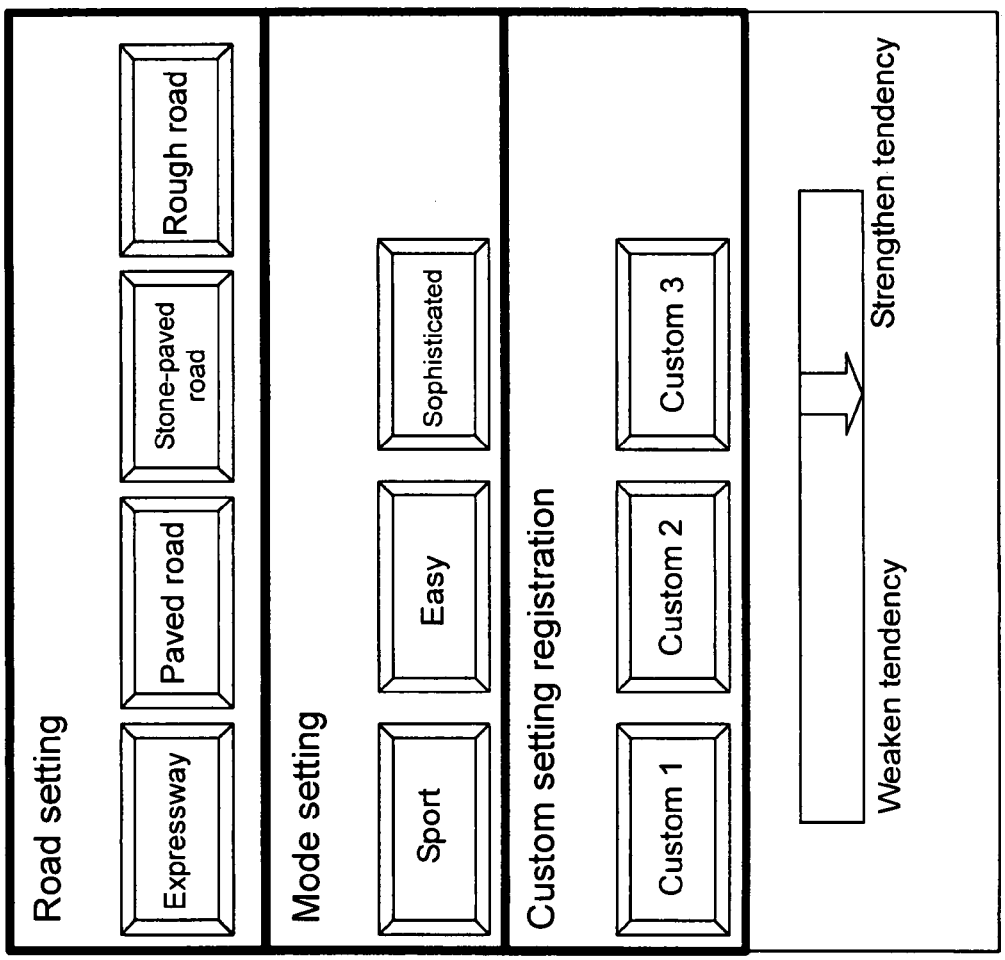
FIG. 4 shows a view showing one example of a setting operation screen.

FIG. 4 shows one example of the setting operation screen. As shown in FIG. 4, a road setting selection region for selecting road setting, a mode setting selection region for selecting the type of driving operation, a custom setting registration region for registering the custom setting by the user, and a strong and weak adjustment region for adjusting strong and weak of the steering feeling setting selected by the road setting and the mode setting are displayed on the setting operation screen.

Buttons for selecting the type of road are displayed in the road setting selection region. In the example shown, four types of "expressway," "paved road," "stone-paved road," and "rough road" are shown as the types of road. These road types are merely an example, and the types of road that can be selected are not limited thereto.

Buttons for selecting the mode indicating the type of driving operation desired by the user are displayed on the mode setting selection region. In the example shown, three types of "sport," "easy" and "sophisticated" are shown as the types of mode. These mode types are merely an example, and the types of mode that can be selected are not limited thereto.

In the example shown, the strength adjustment region is displayed with an interface for accepting the strong and weak adjustment of the steering feeling setting in the form of a slider. In other words, the strong and weak adjustment region is used when the user desires to have the steering feeling set stronger or weaker in accordance with the road setting and the mode setting.

The user selects the road setting and the mode setting, and sets the strong and weak adjustment amount with respect to the setting operation screen described above. The information set in this manner is stored in the set value storage section 14 as the set value.

Buttons for registering the custom setting are displayed in the custom setting registration region. The combination of the road setting and the mode setting selected by the user, and the information related to strong and weak adjustment amount of the relevant setting are collectively registered in the custom setting. Three buttons are shown as custom setting buttons in the illustrated example, and thus three types of custom settings can be registered. However, the illustrated example is merely an example, and the number of custom settings that can be registered is not limited thereto. The custom set value registered by the command input of the user on the custom setting registration region is stored in the custom set value storage section 13 by the setting operation accepting section 11.

When the registered custom setting button is activated by the user, the combination of the road setting and the mode setting, and the strong and weak adjustment amount of the relevant setting registered in the custom setting button are read from the custom set value storage section 13 by the setting operation accepting section 11, and stored in the set value storage section 14 as set value.

The adjustment value output section 15 outputs the adjustment value to the motor controlling unit 3 based on the set value of the steering feeling setting accepted from the user by the setting operation accepting section 11. The adjustment value output section 15 converts the set value stored in the set value storage section 14 into the adjustment value based on the adjustment value conversion table stored in the adjustment value conversion table storage section 16. The adjustment value conversion table shows the correspondence relationship between the set value and the adjustment value. That is, when the set value including information related to the combination of the road setting and the mode setting specified by the user and the strong and weak adjustment amount of the relevant setting are input to the adjustment value conversion table, the adjustment value output section 15 outputs the corresponding adjustment value. In other words, the adjustment value includes information indicating the type of operation mode specified by the user and information indicating the adjustment amount.

In the above example, the adjustment amount is set by the strength adjustment region in the adjustment value output section 15. However, only the setting of the operation mode may be performed in the adjustment value output section 15.

The template set value storage section 12, the custom value storage section 13, and the adjustment value conversion table storage section 16 can be implemented by non-volatile recording medium such as flash memory and hard disc. The set value storage section 14 can be implemented in RAM (Random Access Memory) serving as temporary (primary) storage device.

The steering feeling setting unit 2 may automatically perform mode setting by obtaining information on the type of currently traveling road from the car navigation system. For example, a function of automatically setting to "expressway" mode and weakening the assist force when the car of the user goes onto the expressway, and setting the adjustment value of "quicken response in low-speed region" etc. when going through the pass may be provided with the steering feeling setting unit 2.

(Configuration of Motor Controlling Unit)

Figure 5:
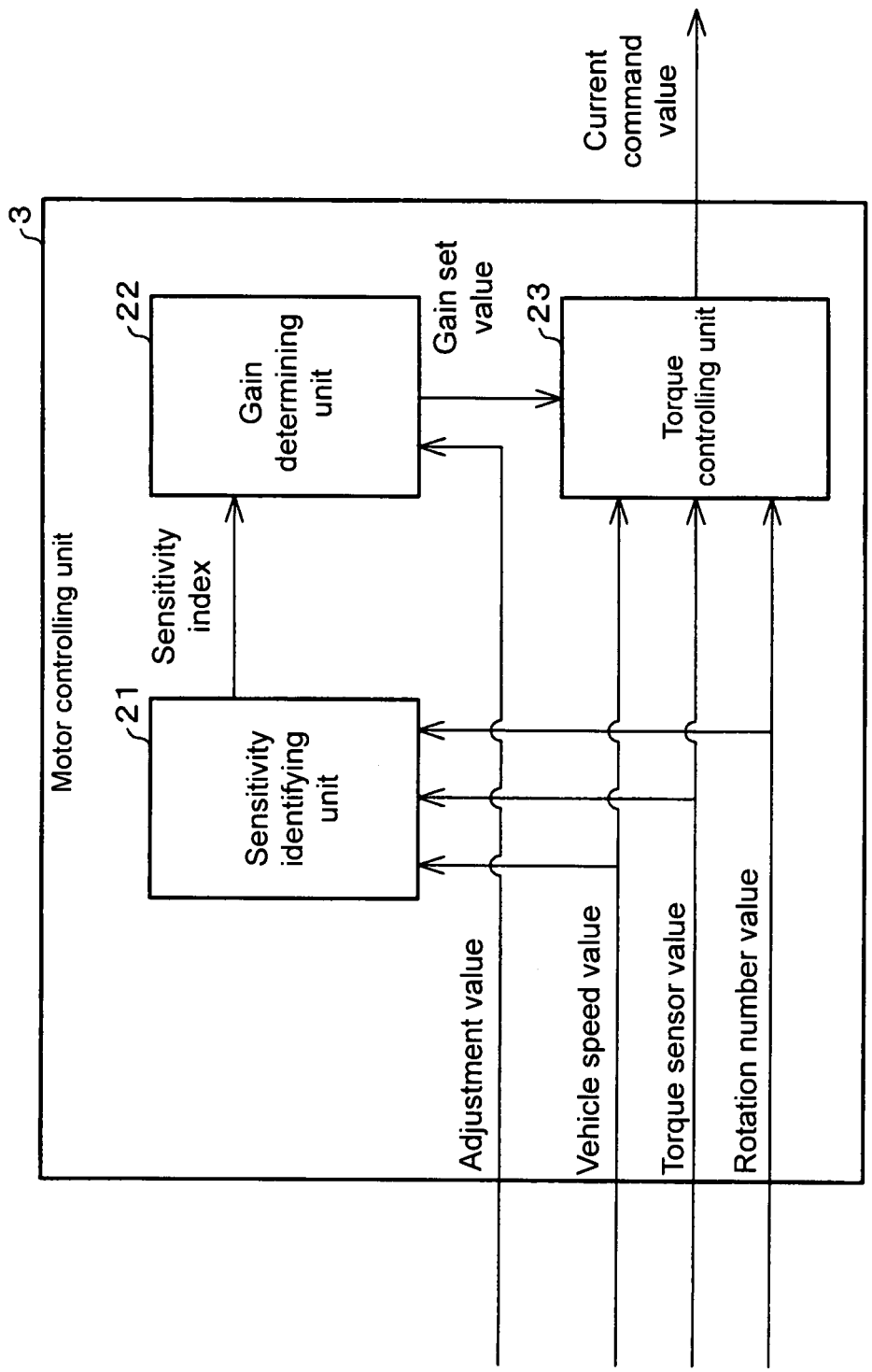
FIG. 5 shows a block diagram showing a schematic configuration of a motor controlling unit of a steering assist system according to an embodiment of the present invention.

The configuration of the motor controlling unit 3 will now be described with reference to FIG. 5. As shown in FIG. 5, the motor controlling unit 3 includes a sensitivity identifying unit (sensitivity identifying device) 21, a gain determining unit (assist force controlling device) 22, and a torque controlling unit (assist force setting device) 23.

The sensitivity identifying unit 21 identifies the steering feeling felt by the user or the driver regarding the steering operation based on the information (operating condition parameter) indicating the operating condition at the relevant point in time of the automobile equipped with the steering assist system 1. In one embodiment, the operating condition parameter uses the vehicle speed value indicating the speed at the relevant point in time of the automobile, the rotational torque in the transmitting section 5B, that is, the torque sensor value indicating the rotational torque when the user rotates the steering wheel, and the rotation number value indicating the rotation number of the assist motor 4. The sensitivity identifying unit 21 identifies the steering feeling based on the operating condition parameters. The sensitivity identifying unit 21 then outputs the identification result to the gain determining unit 22 as sensitivity index. Among the operating condition parameters, the torque sensor value corresponds to the operation force parameter indicating the force applied to the operation member (steering wheel) from the user. The rotation number value corresponds to the operation response parameter indicating the state the assist force applying device (assist motor 4) operates according to the operation by the user. That is, the operating condition parameters are parameters including the operation force parameter and the operation response parameter.

The gain determining unit 22 sets the gain of the current value to be applied to the assist motor 4 based on the sensitivity index received from the sensitivity identifying unit 21, and the adjustment value. The information on the gain set by the gain determining unit 22 is transmitted to the torque controlling unit 23 as gain set value.

The torque controlling unit 23 sets the current value to actually apply to the assist motor 4 as current command value based on the gain set value received from the gain determining unit 22 and the operating condition parameters. In the present embodiment, the vehicle speed value, the torque sensor value, and the rotation number value are used as the operating condition parameters to be applied to the torque controlling unit 23, similar to the above. The current command value set by the torque controlling unit 23 is transmitted to the assist motor 4. The assist motor 4 is supplied with current according to the current command value, and generates the assist torque of the steering.

(Configuration of Sensitivity Identifying Unit)

Figure 1:
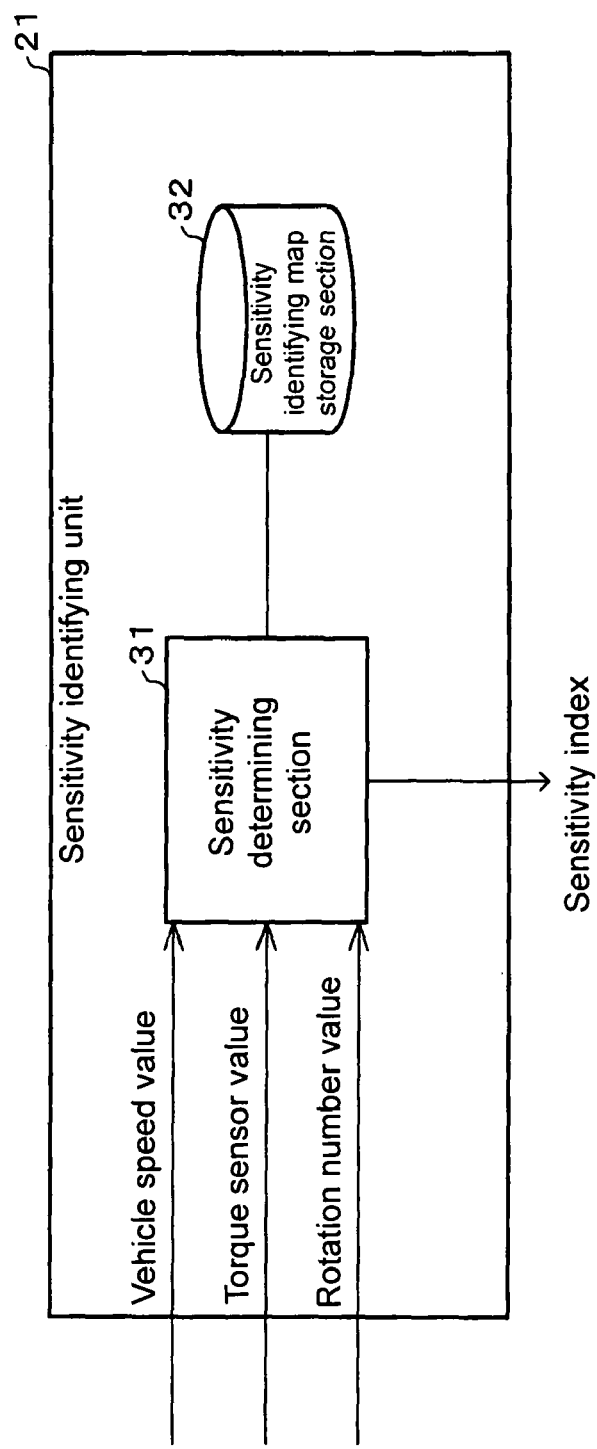
FIG. 1 shows a block diagram showing a schematic configuration of a sensitivity identifying unit in a steering assist system according to an embodiment of the present invention.

FIG. 1 shows the configuration of the sensitivity identifying unit 21. As shown in the figure, the sensitivity identifying unit 21 is configured including a sensitivity determining section (sensitivity determining unit) 31, and a sensitivity identifying map storage section (sensitivity identifying information storage section) 32. The sensitivity determining section 31 outputs the sensitivity index based on the inputted operating condition parameters. The sensitivity determining section 31 specifies the sensitivity index based on the sensitivity identifying map (sensitivity identifying information) stored in the sensitivity identifying map storage section 32.

Figure 6:
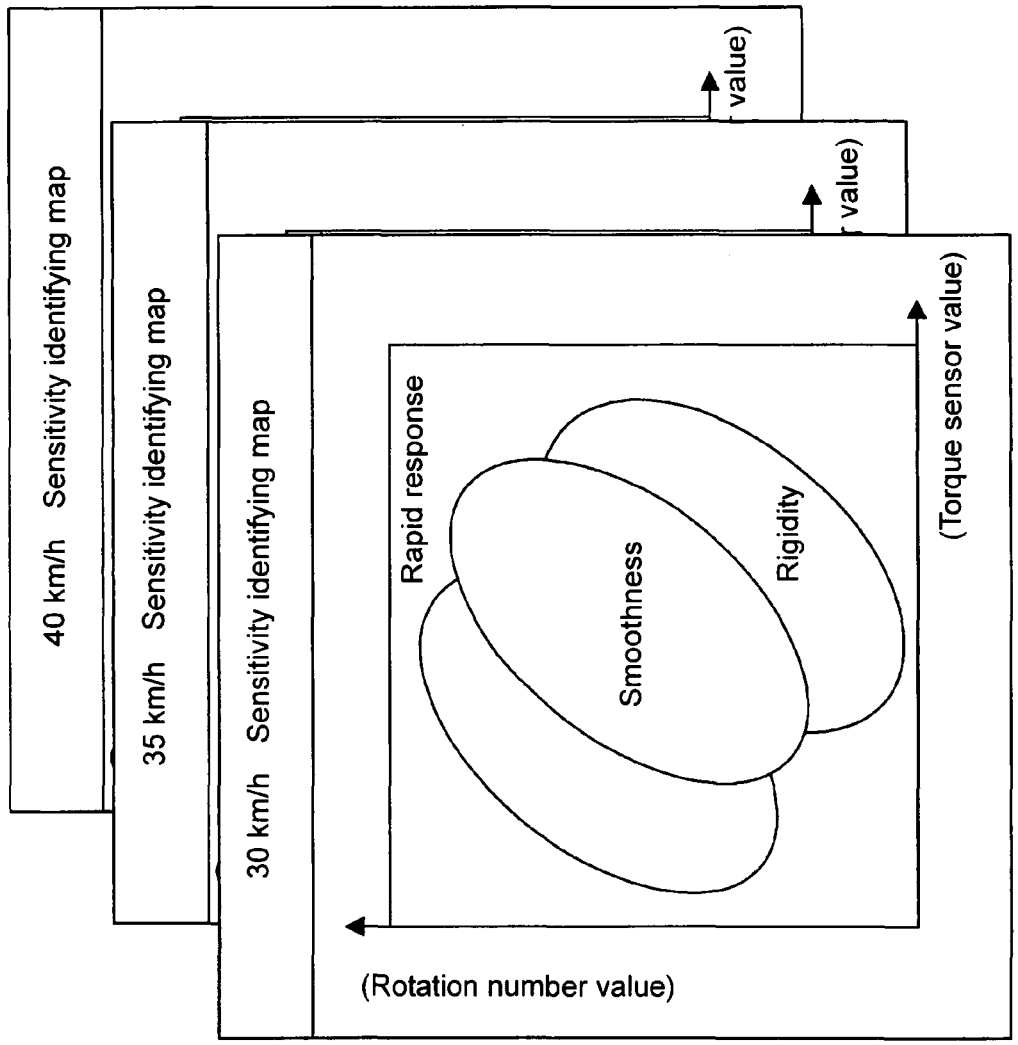
FIG. 6 shows a view showing one example of a sensitivity identifying map.

The sensitivity identifying map is information indicating the correspondence relationship of each value indicated in the operating condition parameter and the sensitivity index. FIG. 6 shows one example of the sensitivity identifying map. In the example shown in FIG. 6, the sensitivity identifying map has a configuration in which a two dimensional map, having a sensitivity region serving as a region of each sensitivity index set on a two dimensional graph having the torque sensor value on the horizontal axis and the rotation number value on the vertical axis, is arranged for each vehicle speed value.

As described above, the sensitivity index is an index indicating the steering feeling felt by the user or the driver regarding the steering operation. In the present embodiment, three indexes of smoothness, rigidity and rapid response are set as the sensitivity index. The sensitivity region corresponding to each sensitivity index is arranged in the sensitivity identifying map.

Smoothness is a steering feeling in which the user feels that the assist force by the assist motor 4 is rapidly responding to the force for rotating the steering wheel without feeling the force caused by friction when starting the steering. Furthermore, smoothness indicates the steering feeling in which the user moderately feels the center of the handle when the direction of the steering wheel passes through a point (center of the handle) at which steering with respect to the left and the right is zero in rotating the steering wheel.

Rigidity is a steering feeling in which the user feels that resistance is being moderately maintained when rotating the steering wheel at a substantially constant speed. The rigidity has, for example, two indexes of no deflection feeling and hard feeling, and is a steering feeling in which the user feels that the vehicle is responding without delay, with no deflection feeling or with hard feeling, when rotating the steering wheel from straightly advancing state. In other words, the rigidity indicates the steering feeling as if the steering wheel and the tire were directly connected without any intervention when the user rotates the steering wheel.

Rapid response is a steering feeling in which the user feels that the assist force by the assist motor 4 follows without delay when the speed of rotating the steering wheel is fast.

The sensitivity determining section 31 outputs in real time the sensitivity index corresponding to the operating condition parameter at that point in time based on the sensitivity identifying map. That is, the sensitivity determining section 31 first specifies the two dimensional map of the corresponding vehicle speed value from the sensitivity identifying map based on the inputted vehicle speed value. The sensitivity determining section 31 then plots the inputted torque sensor value and the rotation number value on the specified two dimensional map, and specifies the sensitivity region including the plotted points. The sensitivity index corresponding to the specified sensitivity region is then outputted.

Figure 18:
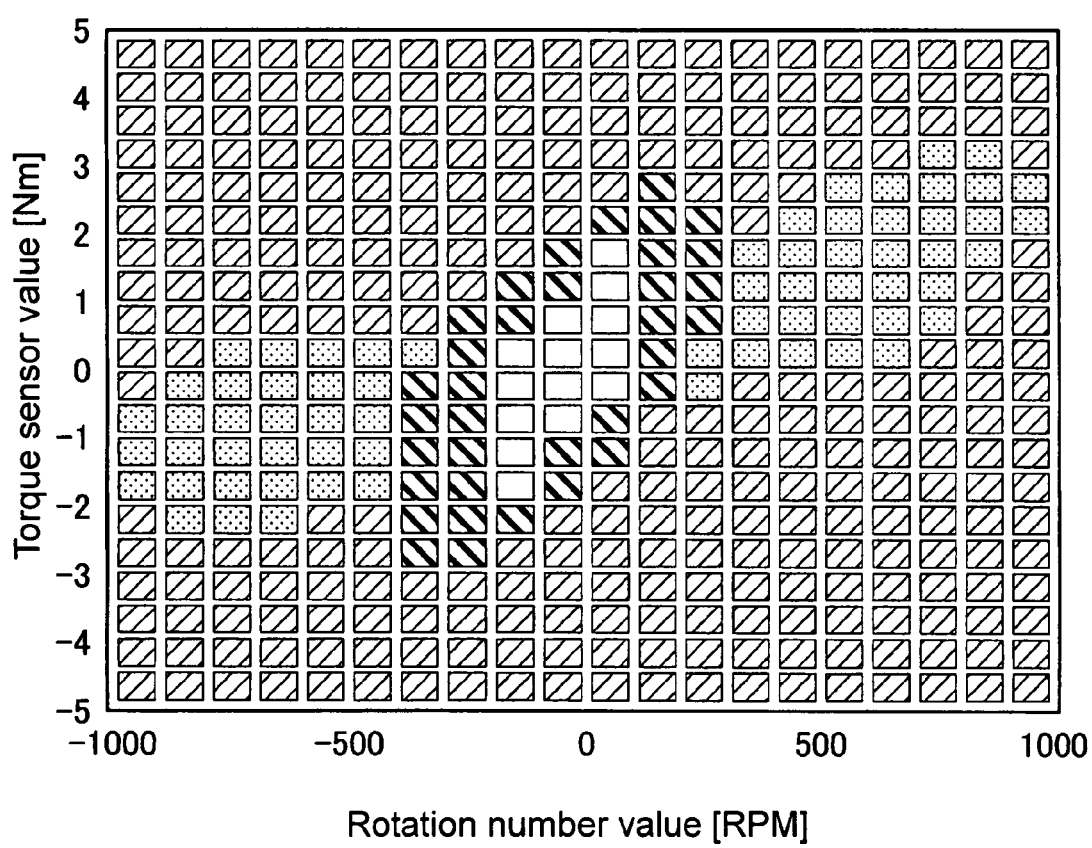
FIG. 18 shows a view showing an example of a two dimensional map related to the torque sensor value and the rotation number value generated by performing pattern recognition based on the experiment data shown in FIG. 17.

Each two dimensional map in the sensitivity identifying map is created in the following manner. FIG. 17A to FIG. 17C each shows experiment data of the torque sensor value and the rotation number value of when the user or the driver feels smoothness, rigidity, and rapid response. The two dimensional map related to the torque sensor value and the rotation number value as shown in FIG. 18 can be created by performing pattern recognition based on the experiment data.

The two dimensional map is arranged for each vehicle speed value. The interval of the vehicle speed value is appropriately set according to the storage capacity of the sensitivity identifying map storage section and the required precision. That is, the two dimensional map to be stored increases when the interval of the vehicle speed value is close, whereby the required storage capacity becomes large but the precision becomes high. If the two dimensional map that completely matches the vehicle speed value at the relevant point in time does not exist, the two dimensional map of the closest vehicle speed value can be referenced.

The sensitivity identifying map in which a plurality of two-dimensional maps is arranged for each vehicle speed value is used in the above example. However, the configuration of the sensitivity identifying map is not limited thereto. The sensitivity identifying map may be configured by a three dimensional map in which a three dimensional space is set having the torque sensor value, the rotation number value and the vehicle speed value as X, Y, Z axes respectively, and the sensitivity space serving as a space corresponding to each sensitivity index is formed in the three dimensional space. If the parameter of the operating condition parameter is four or more, the sensitivity identifying map may be configured by a multidimensional map of four or more dimensions.

The sensitivity identifying map storage section 32 is preferably realized by a non-volatile recording medium such as flash memory and hard disc.

(Other Examples of Sensitivity Index)

The above example of the sensitivity index is merely one example, and various other sensitivity indexes may be set. Examples other than the above sensitivity index example include slackness of steering force/vehicle response, through feeling in time of cutting/returning, springiness, extending in vehicle response, follow-up of vehicle response and the like.

The slackness of steering force/vehicle response is a steering feeling in which the user feels the vehicle response after feeling resistance in rotation when the user rotates the steering wheel from the straightly advancing state. That is, if an appropriate relationship is found between a timing of feeling the resistance in rotation, and a timing of feeling vehicle response, the user will feel as if rotating the steering wheel without waste. The slackness of the steering force/vehicle response is then satisfactory.

The through feeling in cutting is a steering feeling in which the user feels that the degree of alleviating the degree of increase in the steering force by the assist force is satisfactory when the user rotates (cuts) the steering wheel from the straightly advancing state. When rotating the steering wheel, the assist force is controlled so that increase in the steering force becomes smaller than before. The assist force is controlled to alleviate the load on the driver when the steering force increases from the start of rotation and the steering force becomes greater than or equal to a predetermined value. If the rate of increase in the steering force is too small, the driver sometimes feels that the rotated amount of the steering wheel is not sufficient. In this case, the driver might rotate the steering wheel more than necessary. Consequently, the driver deviates from the desired course, thereby requiring extra correction steering. That is, if the through feeling in cutting is satisfactory, the driver can have a steering feeling without sense of insecurity. The through feeling in time of returning is the opposite to that in time of cutting. The through feeling in returning is the steering feeling in which the user feels that the degree of application of the assist force with respect to reduction in the steering force is satisfactory when returning the vehicle to the straightly advancing state from the state of advancing in a curved manner.

Springiness is the steering feeling in which the user feels the force of returning the steering wheel in the direction opposite to the rotating direction when rotating the steering wheel. The extending of vehicle response is the steering feeling in which the user feels extension of the vehicle response with respect to the steering amount. The follow-up of vehicle response is the steering feeling in which the user feels follow-up of the vehicle response with respect to steering.

(Other Examples of Operating Condition Parameter)

The vehicle speed value, the torque sensor value and the rotation number value are used as the operating condition parameters in the above example. However, the operating condition parameters are not limited thereto. The determination of sensitivity by the sensitivity identifying unit 21 can be performed as long as the operating condition parameters include at least both a parameter reflecting the force applied by the user and a parameter indicating the condition in which the machine is operated according to the operation by the user. In the case of the steering assist system 1, the parameter reflecting the force inputted from the user includes amount of change in the rotational torque of when the user rotates the steering wheel in addition to the torque sensor value. In addition to the rotation number value and the vehicle speed value, the parameter indicating the condition in which the machine is operated according to the operation by the user includes traverse direction gravitational acceleration (traverse G) generated with respect to the automobile, yaw rate (speed at which the rotational angle in the turning direction of the vehicle changes when viewing the cornering automobile from above) of the automobile, steering angle (angle of steering wheel), steering angle speed and the like.

As described above, the parameters of the operating condition parameter may be four or more. In this case as well, determination of sensitivity is possible as long as at least the parameter reflecting the force inputted by the user and a parameter indicating the condition in which machine is operated according to the operation by the user are included.

(Configuration of Gain Determining Unit)

Figure 7:
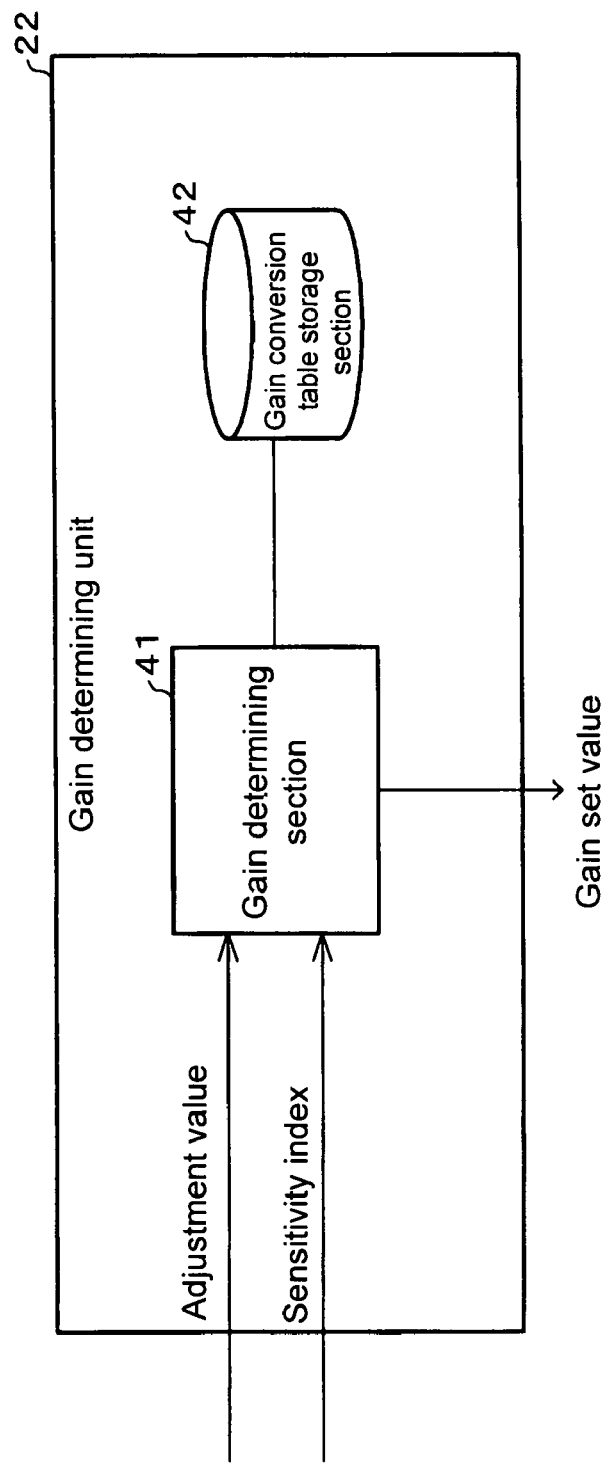
FIG. 7 shows a block diagram showing a schematic configuration of a gain determining unit according to an embodiment of the present invention.

The configuration of the gain determining unit 22 will now be described with reference to FIG. 7. As shown in FIG. 7, the gain determining unit 22 includes a gain determining section (assist force controlling unit) 41 and a gain conversion table storage section (assist force setting information storage section) 42. The gain determining section 41 outputs a gain set value (assist force setting information) based on the inputted sensitivity index and the adjustment value. The gain determining section 41 specifies the gain set value based on the gain conversion table stored in the gain conversion table storage section 42.

The gain conversion table is a table showing the relationship between the sensitivity index and adjustment value, and the gain set value. The gain set value is a value for setting the gain table of various parameters required in setting the current command value to be provided with the assist motor 4 in the torque controlling unit 23. In the present embodiment, information for setting the gain table showing the relationship of the current value with respect to the torque sensor value, the gain table showing the relationship of the current value with respect to the rotation number value, and the gain table showing the relationship of the current value with respect to the vehicle speed value is used as the gain set value.

Figure 8A:
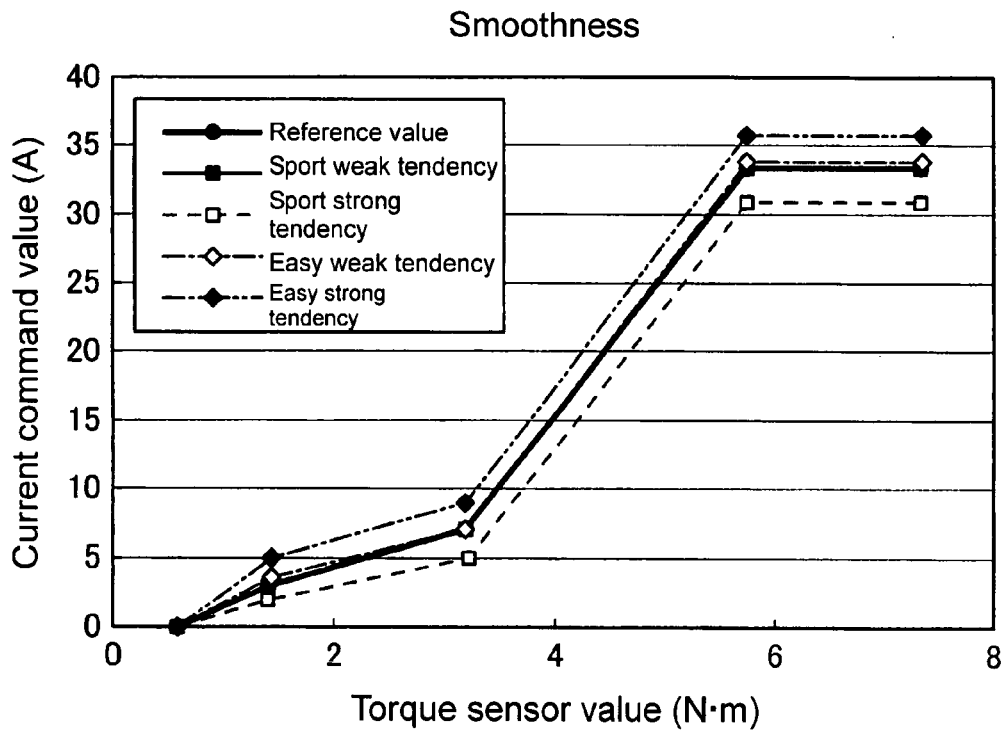
FIGS. 8A and 8B show views showing one example of a gain table.
Figure 8B:
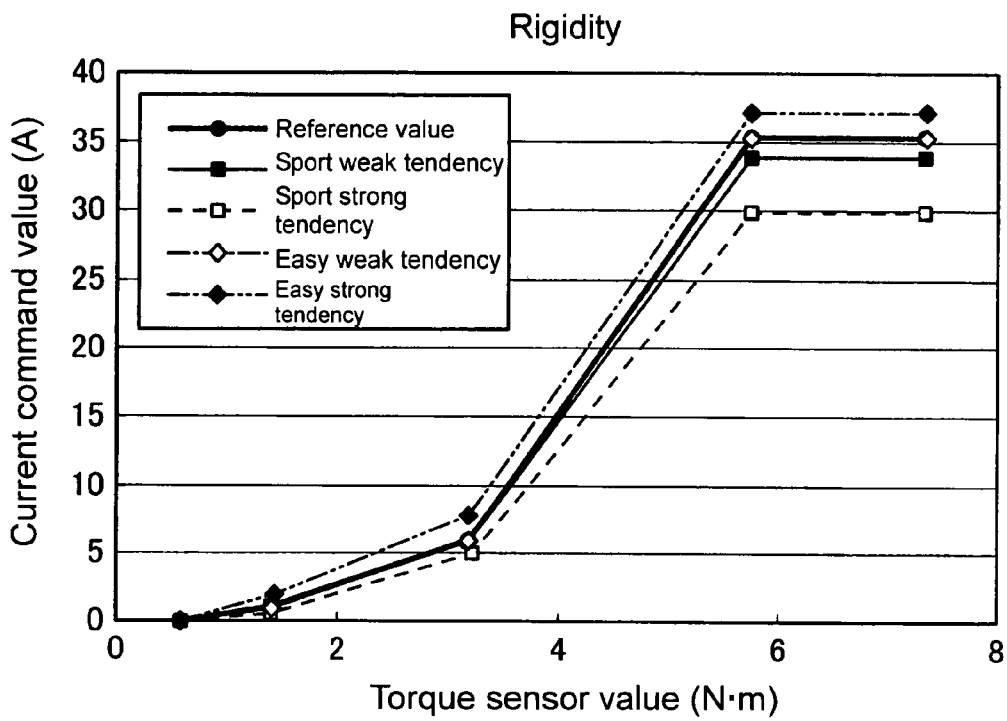
Figure 9A:
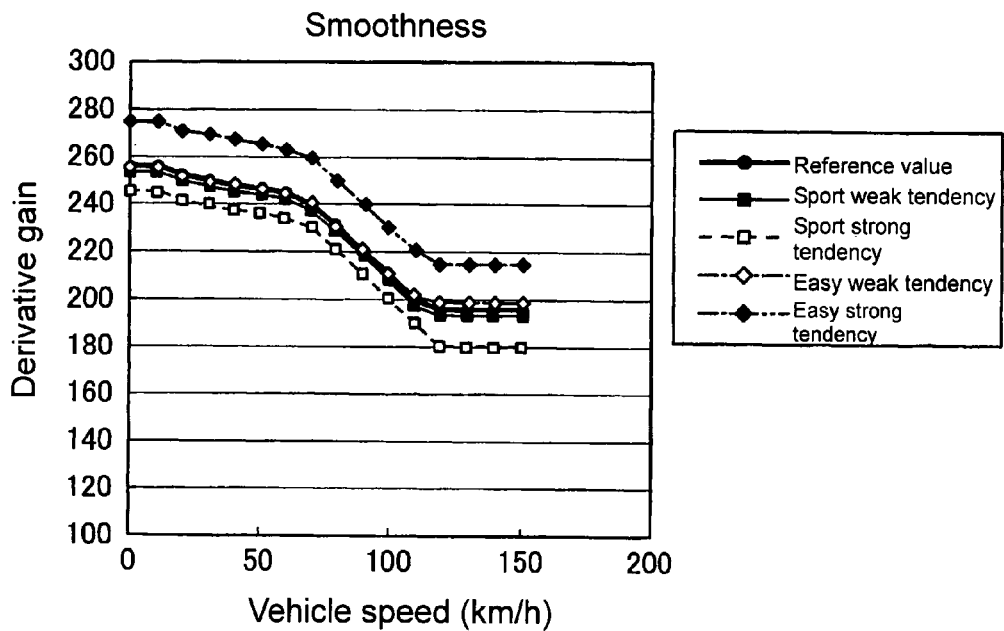
FIGS. 9A and 9B show views showing another example of a gain table.
Figure 9B:
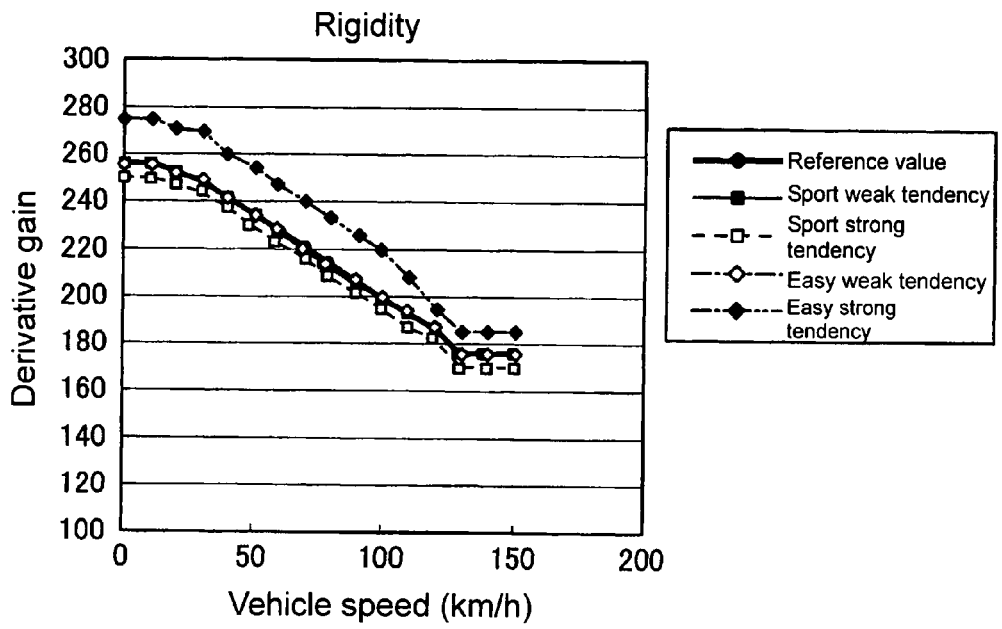

FIG. 8A and FIG. 8B show one example of a gain table showing the relationship of the current value with respect to the torque sensor value corresponding to smoothness and rigidity, respectively. FIG. 9A and FIG. 9B show one example of a gain table showing the relationship of the derivative gain with respect to the vehicle speed value corresponding to smoothness and rigidity, respectively. The derivative gain represents the coefficient used in calculating the current value based on the vehicle speed value. That is, the torque controlling unit 23 calculates the value obtained by multiplying the derivative gain to the inputted vehicle speed value as the current value. Such gain table is set for each sensitive index, and such data are stored in the gain conversion table storage section 42. An example of a gain table showing the relationship of the current value with respect to the rotation number value is not shown, but is the gain table having the horizontal axis as the rotation number value in FIG. 8A and FIG. 8B, or FIG. 9A and FIG. 9B.

When the sensitivity index changes from smoothness to rigidity, the gain table shown in FIG. 8A or FIG. 9A is used for smoothness. The gain table shown in FIG. 8B or FIG. 9B is used from when the sensitivity index is changed to rigidity.

As shown in the figures, the gain table includes tables corresponding to "weak tendency to sport", "strong tendency to sport", "weak tendency to easy" and "strong tendency to easy" in addition to the table serving as the reference value. Such table corresponds to the adjustment value set in the steering feeling setting unit 2. That is, the mode setting and the strong and weak adjustment of the steering feeling setting by the strong and weak adjustment region are performed in the steering feeling setting unit 2, and the gain table can be switched according to the corresponding adjustment value.

In other words, the adjustment value outputted from the steering feeling setting unit 2 includes information specifying the gain table to be adjusted, and information indicating the degree of adjustment of the gain table. The gain determining section 41 references the information included in the adjustment value to specify the gain table to be adjusted, determines the degree of adjustment, and determines the gain table.

If, for example, "expressway" is set in the road setting, the gain table showing the relationship of the current value with respect to the torque sensor value is set as the gain table to be adjusted. The adjustment value with which the gain table is adjusted to adapt (e.g., weaken assist force etc.) to the steering in expressway is inputted to the gain determining section 41. In this case, the adjustment value may be set so that adjustment is performed only when the vehicle speed value is within a predetermined range (e.g., greater than or equal to 100 km/h) etc.

If "sport" is set in the mode setting, the gain table corresponding to the sport mode is selected from the gain tables corresponding to the sensitivity index at the relevant point in time. The gain table of "weak tendency to sport" or "strong tendency to sport" is selected according to the information indicating the degree of adjustment. The adjustment value with which the gain table is adjusted to adapt (e.g., quicken response etc.) to the steering in sport traveling is inputted to the gain determining section 41.

Similarly, if "easy" is set in the mode setting, the gain table corresponding to the easy mode is selected from the gain tables corresponding to the sensitivity index at the relevant point in time. The gain table of "weak tendency to easy" or "strong tendency to easy" is selected according to the information indicating the degree of adjustment. The adjustment value with which the gain table is adjusted to adapt to the steering in easy traveling is inputted to the gain determining section 41.

In the examples shown in FIGS. 8A and 8B or FIGS. 9A and 9B, four gain tables are arranged according to the adjustment value in addition to the reference value with respect to one sensitivity index, but a larger number of gain tables may be arranged.

The gain determining section 41 outputs, in real time, the gain set value corresponding to the sensitivity index and the adjustment value at the relevant point in time based on the gain conversion table. That is, the gain determining section 41 first specifies the corresponding gain table for each parameter based on the inputted sensitivity index. The gain determining section 41 then selects the gain table corresponding to the inputted adjustment value, and outputs the relevant gain table for each parameter.

A plurality of gain tables are arranged according to the adjustment value. The number of gain tables for each adjustment value is appropriately set according to the storage capacity of the gain conversion table storage section 42 and the required precision. When there is a large number of gain tables for each adjustment value, the required storage capacity increases, but the adaptation degree to the adjustment value increases. If the gain table that completely matches the adjustment value at the relevant point in time does not exist, the gain table of the closest adjustment value may be referenced.

The gain conversion table storage section 42 is preferably realized by a non-volatile recording medium such as flash memory and hard disc.

(Configuration of Torque Controlling Unit)

Figure 10:
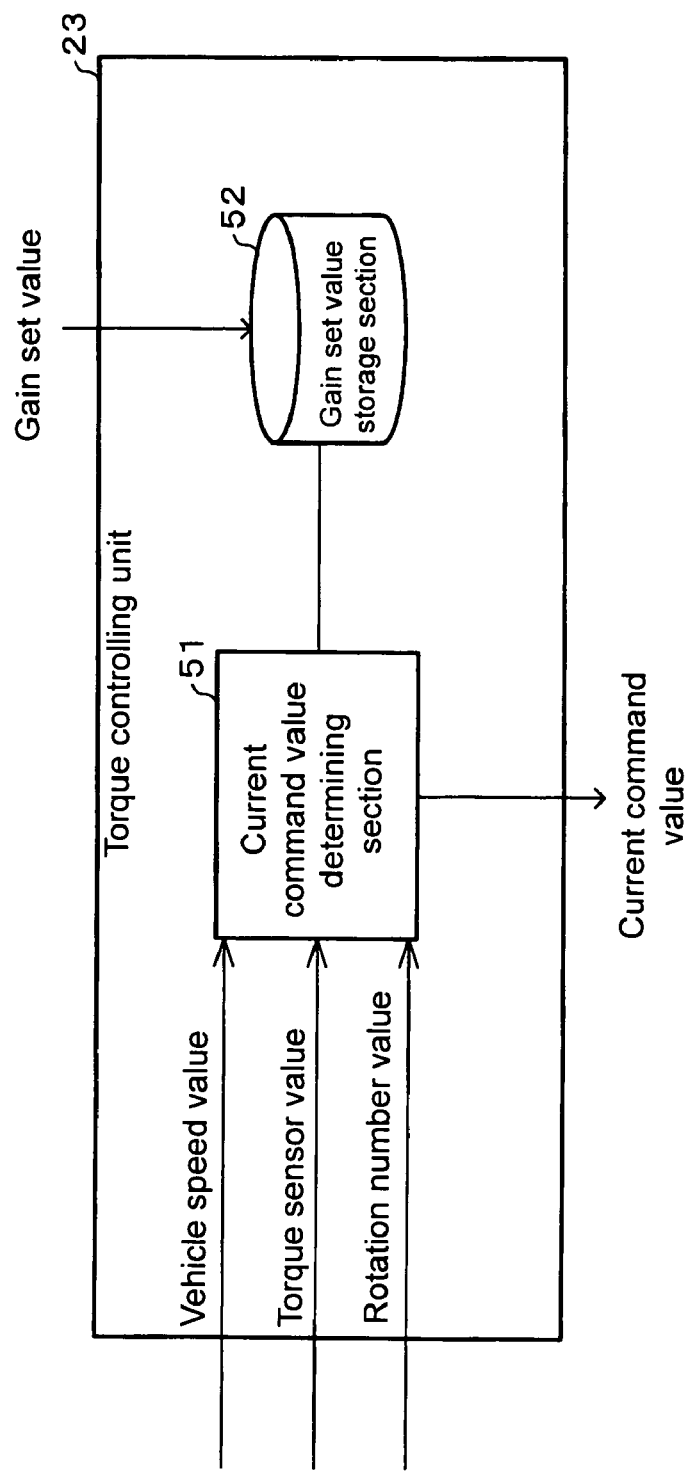
FIG. 10 shows a block diagram showing a schematic configuration of a torque controlling unit according to an embodiment of the present invention.

The configuration of the torque controlling unit 23 will now be described with reference to FIG. 10. As shown in the figure, the torque controlling unit 23 includes a current command value determining section (assist force setting unit) 51, and a gain set value storage section (assist force setting information storage section) 52.

The gain set value received from the gain determining unit 22 is stored in the gain set value storage section 52. The current command value determining section 51 determines and outputs the current command value (assist force set value) with reference to the gain set value stored in the gain set value storage section 52 based on the inputted vehicle speed value, torque sensor value, and rotation number value.

As described above, the gain set value includes the gain table corresponding to each parameter, that is, the vehicle speed value, the torque sensor value, and the rotation number value. The current command value determining section 51 specifies the current value for each parameter, and determines the current command value to be outputted in accordance therewith. In one embodiment, the sum of the current value specified for each parameter is set as the current command value to be outputted in the present embodiment. Specifically, the current value corresponding to the vehicle speed value and the torque value at the relevant point in time is calculated by a current value calculator based on the gain table indicating the relationship of the current value with respect to the torque sensor value. The derivative gain corresponding to the vehicle speed value at the relevant point in time is calculated by a derivative gain calculator based on the gain table showing the relationship of the derivative gain with respect to the vehicle speed value. The derivative value of the torque sensor value is calculated in the derivative computing section, the current value is calculated by the product of the derivative gain calculated by the derivative gain calculator and the derivative value of the torque calculated in the derivative computing section, and then added to the current value calculated by the current command value calculator. The finally outputted current command value is set by subtracting the current value determined also according to the rotation number value.

In the above example, the sum of the current value specified for each parameter is set as the current command value to be outputted, but the present invention is not limited thereto. For example, an average may be taken instead of the sum of the current value, and the largest (or smallest) current value may be set as the current command value.

The current command value determining section 51 may change the gain table corresponding to the torque sensor value and/or rotation number value according to the vehicle speed value. That is, the current command value determining section 51 may create a new vehicle speed value corresponding gain table by multiplying a coefficient corresponding to the vehicle speed value to the gain table corresponding to the torque sensor value and/or the rotation number value stored in the gain set value storage section 52. In this case, the current command value determining section 51 specifies the current value corresponding to the inputted torque sensor value and/or the rotation number value based on the newly created vehicle speed value corresponding gain table. This can adapt to the situation when it is preferable to change the current value corresponding to the torque sensor value and/or the rotation number value according to the vehicle speed value.

In this example, the current command value determining section 51 changes the gain table corresponding to the torque sensor value and/or the rotation number value according to the vehicle speed value, but the gain table corresponding to the vehicle speed value may be set in the gain determining unit 22. In this case, the vehicle speed value is inputted to the gain determining unit 22, and the gain determining section 41 outputs the gain set value taking also the vehicle speed value into consideration. The gain determining section 41 may multiply a coefficient corresponding to the vehicle speed value to the gain table corresponding to the torque sensor value and/or the rotation number value to generate a vehicle speed value corresponding gain table. The gain conversion table showing the relationship between the sensitivity index, adjustment value and vehicle speed value and the gain set value may be stored in the gain conversion table storage section 42, and the gain determining section 41 may determine the gain set value based thereon. A case in which the vehicle speed value is inputted to the gain determining unit 22 includes a case of dynamically changing the parameters according to the vehicle speed such as changing only the gain of the limited speed region in the expressway setting when "expressway" is set in the mode setting, a case of having the amount of information to be transmitted from the gain determining unit 22 to the torque controlling unit 23 as small as possible in view of difference in operation period of the gain determining unit 22 and the torque controlling unit 23, hardware/software process etc.

In the latter case, the gain table showing the relationship of the current value with respect to the torque sensor value corresponding to a specific sensitivity index shown in FIG. 8 is arranged for each vehicle speed value. In this case, the number of gain tables stored in the gain conversion table storage section 42 increases. However, the gain table corresponding to the vehicle speed value can be accurately set, thereby enhancing the precision of assist force control.

(Method of Setting Current Command Value)

When sensitivity at the relevant point in time is identified by the sensitivity identifying unit 21, the gain set value adapted to the sensitivity identified by the gain determining unit 22 is set, as described above. The torque controlling unit 23 sets the current command value based on the gain set value. If the sensitivity identified by the sensitivity identifying unit 21 is changed, the current command value is accordingly changed. If the current command value is changed greatly, the assist force is also to be changed greatly, and the user may have an uncomfortable feeling in the steering operation. If parameter values such as vehicle speed value, torque sensor value and rotation number value rapidly changes, the current command values are rapidly changed in response thereto, and the assist force is also to change greatly. Specifically, it is found through experiments that the user has an uncomfortable feeling when the assist force is changed rapidly within about 1 msec, but does not have an uncomfortable feeling when the assist force is changed over a time longer than or equal to 100 msec.

A configuration of performing the control so that the torque controlling unit 23 gradually changes in the current command value over a time longer than or equal to 100 msec may be provided to prevent the uncomfortable feeling. The methods of such control include the following:

(1) a method of gradually changing the current value determined for each parameter such as vehicle speed value, torque sensor value and rotation number value; and (2) a method of gradually changing the finally outputted current command value determined from the current value determined for every parameter.

Figure 11:
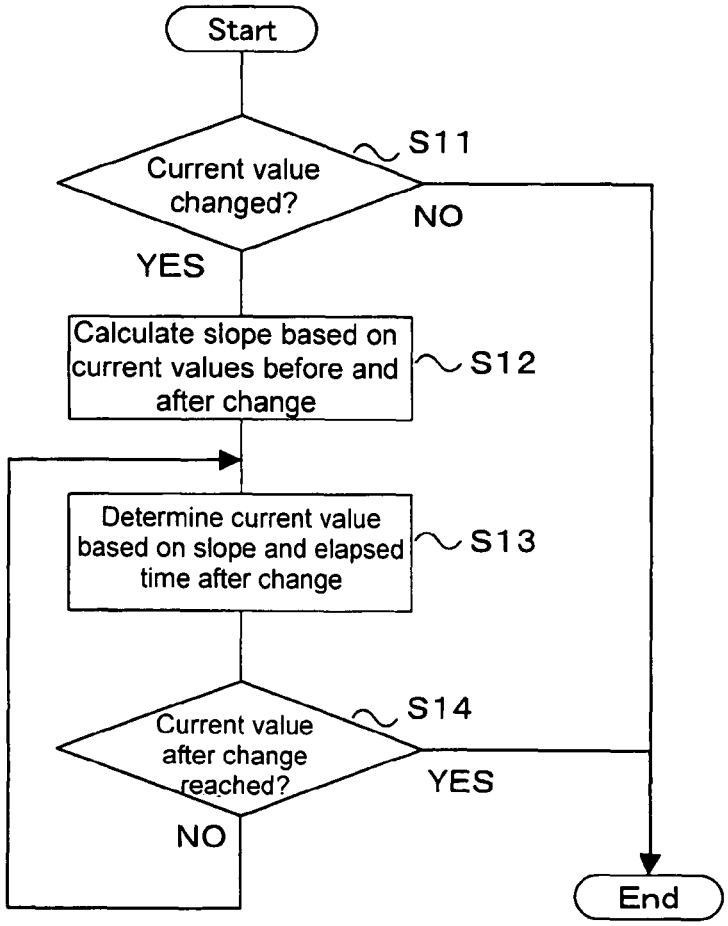
FIG. 11 shows a flowchart illustrating an example of the process of changing the current value.

First, the method (1) of gradually changing the current value determined for each parameter such as vehicle speed value, torque sensor value and rotation number value will be described with reference to the flowchart shown in FIG. 11. First, in step 11 (referred to as S11 etc. hereinafter), the current value determining section 51 determines whether or not the value of the current value determined by the gain table corresponding to one of the parameters has changed. The current value changes when the sensitivity identified by the sensitivity identifying unit 21 is changed, the value of the parameter is changed etc.

If NO in S11, that is, if the current value has not changed, change in assist force that makes the user feel uncomfortable does not occur, and thus a control gradually changing the current value is not performed.

If YES in S11, that is, if the current value has changed, the slope serving as the time change amount of the current value is calculated by the current command value determining section 51 based on a predetermined delay time and the difference between the current values of before and after the change in S12. Specifically, the slope is calculated by dividing the difference between the current values of before and after the change by the predetermined delay time. The predetermined delay time is set in advance to be a time longer than or equal to 100 msec.

Subsequently, in S13, the current command value determining section 51 determines the current value based on the slope calculated as above and the elapsed time after the change in the current value. That is, the current value is set by the following equation:

(Current value before the change in the current value)+(slope)×(elapsed time from the time point on which the current value rapidly changed)

In S14, the current command value determining section 51 determines whether or not the current value set in S13 has reached the current value after the current value rapidly changed. If it is determined that it has not reached as a result of the determination, the current command value determining section 51 repeats the process of S13, and if reached, a control of gradually changing the current value is terminated.

Figure 12:
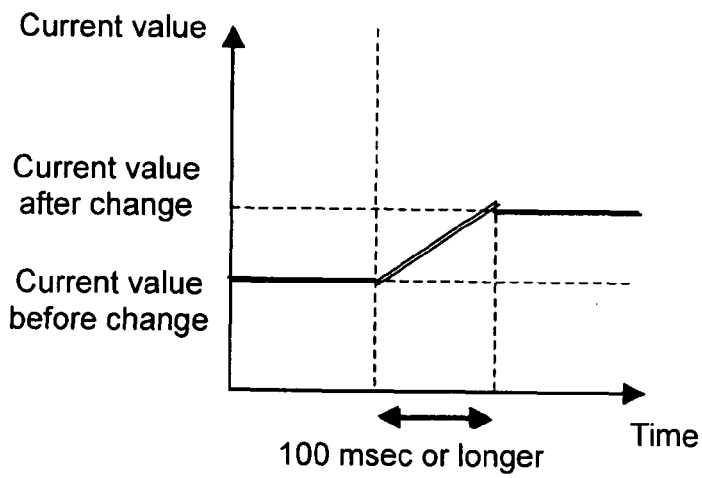
FIG. 12 shows another example of linearly changing the current value.

An example of change in the current value when the above control is performed is shown in FIG. 12. As shown in FIG. 12, the current value changes linearly from the value before change in the current value to the value after change in the current value over a time of the delay time. The assist force thus can be changed without the user feeling uncomfortable.

In the above example, the current value is linearly changed from before to after the change in the current values, but the way of changing the current value is not limited thereto. The current value may be changed in any way as long as the current value is smoothly changed. For example, change can be carried out so as to apply an LPF (Low Pass Filter) on the change in current value. In this case, the flowchart shown in FIG. 11 is modified as below. First, in S12, the current command value determining section 51 sets a time constant T determined by a predetermined delay time t1 instead of calculating the slope. The time constant T is set by, for example, the equation T=t1/5. In step S13, the current command value determining section 51 determines the current value based on the time constant T calculated as above and the elapsed time after the current value rapidly changed. That is, the current value is set according to the equation (current value before the current value rapidly changed)+K(1−e(−t/T)), where t is an elapsed time from the time point on which the current value rapidly changed.

Figure 13:
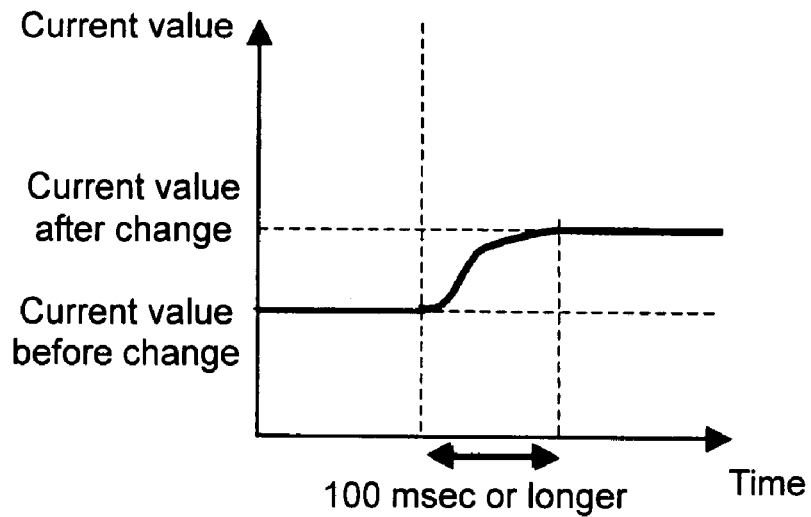
FIG. 13 shows another example of changing the current value using the LPF process.

An example of change in the current value when the above control is performed is shown in FIG. 13. As shown in FIG. 13, the current value is changed in an LPF applied state from the value before change in the current value to the value after change in the current value over a time of the delay time. The assist force thus can be changed without the user feeling uncomfortable.

Figure 14:
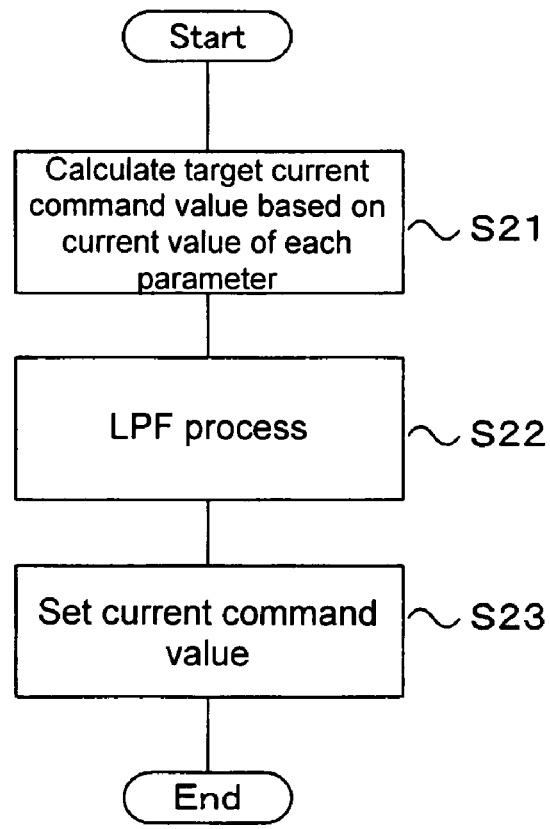
FIG. 14 shows a flow chart illustrating the process of changing the finally outputted current command value determined from the current value.

The method (2) of gradually changing the finally outputted current command value determined based on the current value determined for each parameter will now be described with reference to the flowchart shown in FIG. 14. First, in S21, the current command value determining section 51 calculates the target current command value based on the current value of each parameter. Specifically, the current command value determining section 51 determines the target current command value by calculating the sum of the current values obtained for each parameter. Subsequently, in S22, the current command value determining section 51 performs the LPF process when changing from the current command value at the relevant point in time to the target command value and sets the result as the current command value (S23). The time constant in the LPF process is set so as to be the delay time of longer than or equal to 100 msec set in advance.

Figure 15:
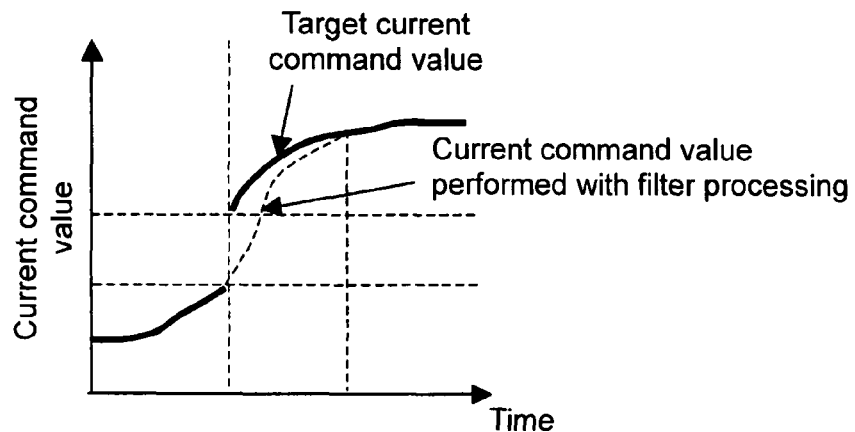
FIG. 15 shows an example of changing the finally outputted current command value determined from the current value.

An example of change in the current value when the above control is performed is shown in FIG. 15. As shown in FIG. 15, the current value changes in an LPF applied state from the value before change in the current command value to the target current command value. The assist force thus can be changed without the user feeling uncomfortable.

Figure 16:
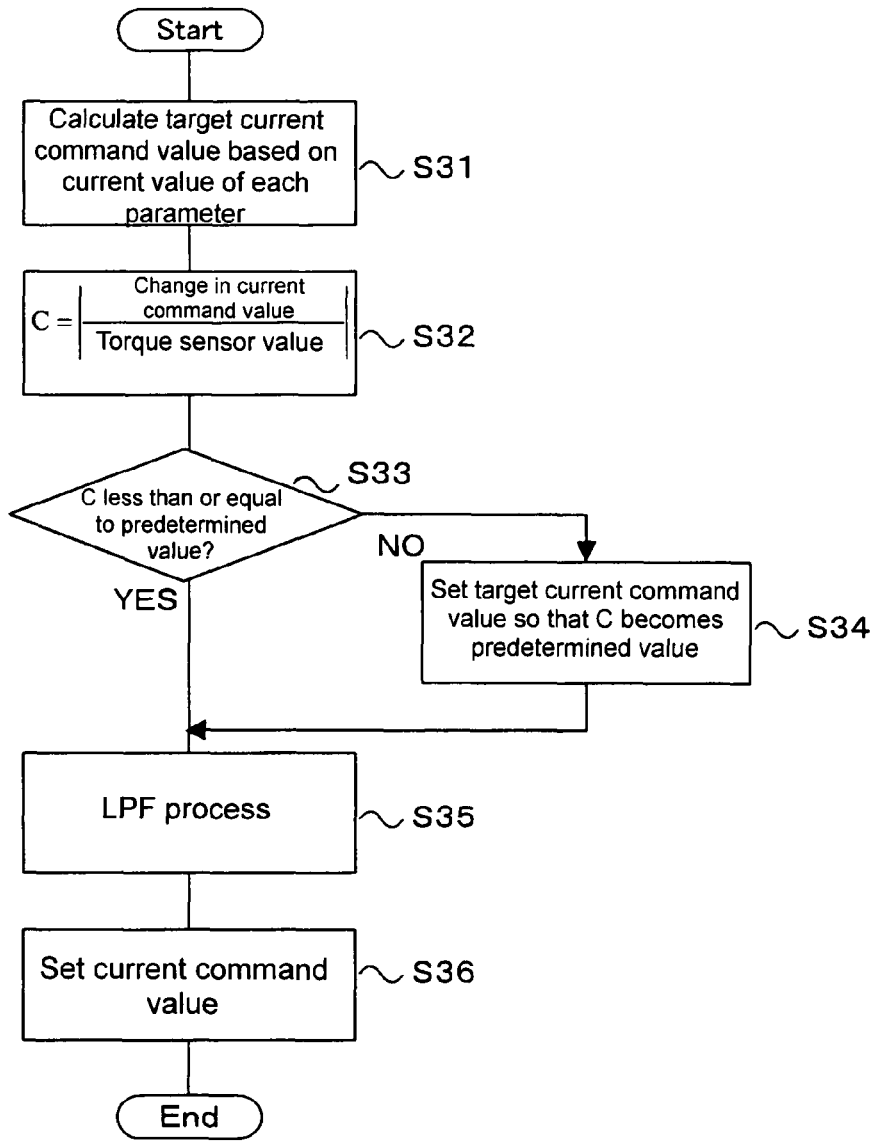
FIG. 16 shows a flow chart illustrating an example of the process of limiting the amount of change in the current command value within a range the user does not have an uncomfortable feeling.

According to the Weber's law of psychophysics, the difference threshold is known to change proportionally according to the value of the reference stimulus. That is, the difference threshold is assumed as the amount of change in the current command value, and the reference stimulus is assumed as the torque sensor value serving as the inputted torque from the relevant law. If the rate of change in the current command value with respect to the torque sensor value is too large, the user is likely to have an uncomfortable feeling in the steering operation even if the current command value is gradually changed. Therefore, the following processes may be performed after the target current command value is calculated in the above process. FIG. 16 shows the flow of process for such case. In the figure, S31, S35 and S36 are the same as S21, S22 and S23 shown in FIG. 14, and thus the description thereof will be omitted.

The target current command value is calculated in S31. In S32, the current command value determining section 51 calculates, as C, the absolute value of the value obtained by dividing the difference (change in current command value) between the current command value at the relevant point in time and the target current command value by the torque sensor value. In S33, the current command value determining section 51 determines whether or not C is less than or equal to the predetermined value set in advance. The predetermined value is a value set in advance as the value for which the user does not have an uncomfortable feeling in the steering operation. If YES in S33, the target current command value calculated in S31 is used as it is and the process of S35 is performed. If NO in S33, the target current command value is reset so that the C becomes the predetermined value set in advance, and the processes from S35 are performed.

According to the above process, the amount of change in the current command value is limited to a range in which the user does not have an uncomfortable feeling, and thus a natural steering feeling is provided to the user.

(Another Example of Sensitivity Identifying Method)

The sensitivity identifying unit 21 determines the sensitivity at the relevant point in time based on the sensitivity identifying map in the example described above. The method of identifying the sensitivity is not limited thereto. For example, the sensitivity may be identified through determining method using Lissajous characteristic quantity, determining method using the characteristic quantity of the time-series data etc.

Figure 19:
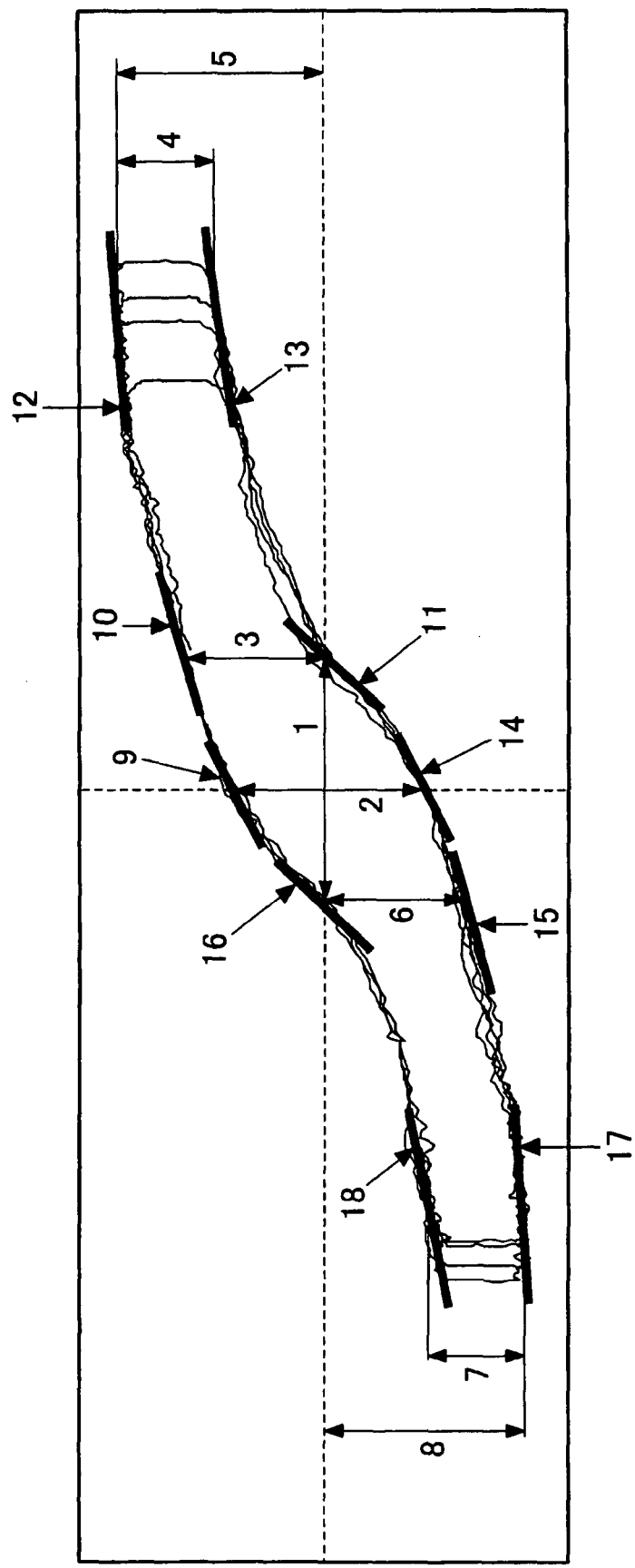
FIG. 19 shows a graph showing the change in time when two parameters different from each other serving as operating condition parameters are taken on the vertical axis and the horizontal axis.

FIG. 19 shows a graph showing the change in time, in which two parameters different from each other that serve as the operating condition parameters are taken on the vertical axis and the horizontal axis. The sensitivity can be identified by determining the value of the characteristic quantity or phase difference indicated by numbers in the graph.

Figure 20A:
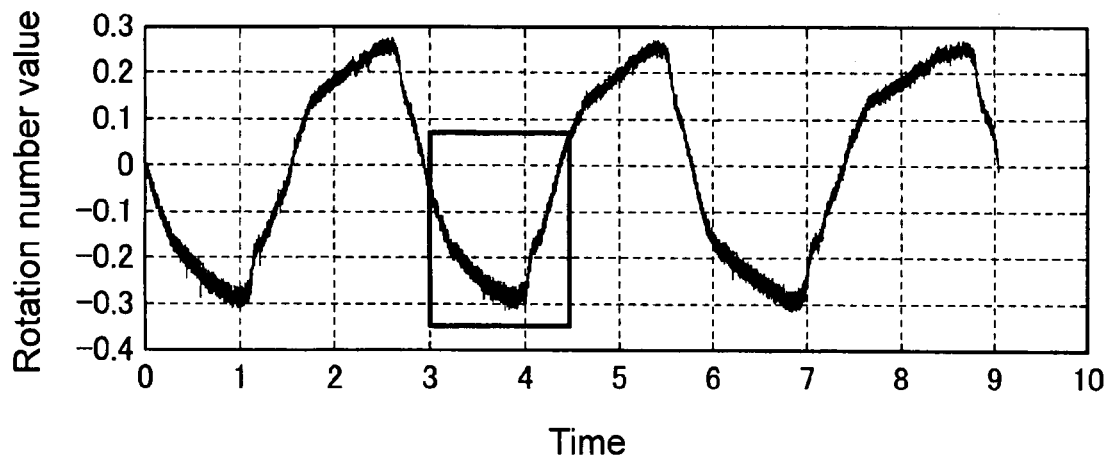
FIGS. 20A and 20B show views showing one example of time-series data of the rotation number value and the torque sensor value, respectively.
Figure 20B:
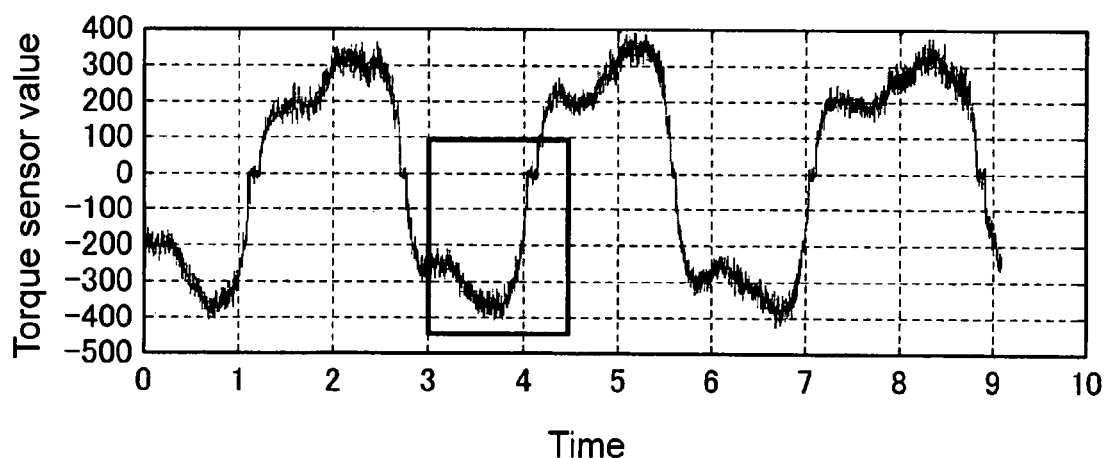

FIGS. 20A and 20B show one example of time-series data of the rotation number value and the torque sensor value, respectively. With respect to the time-series data, a window corresponding to the duration of a predetermined time is set, and the sensitivity is identified by the characteristic quantity obtained from the data in the window. The feature quantity includes slope of data with respect to time, ratio between parameters, amplitude or period of peak-to-peak, phase difference at zero-crossing point between parameters, ratio of peak values between parameters and the like.

In calculating the characteristic quantity, a non-sensitive band is preferably set in the vicinity of a value at which the parameter value becomes zero in the time-series data so as not to influence the straightly advancing property when the automobile is advancing straight.

(Application Example Other than Steering Assist System)

In one embodiment, the steering feeling setting unit 2 and the motor controlling unit 3 are provided to control the assist motor that applies assist force to the steering device 5. However, the controlling target is not limited thereto. That is, similar control can be performed with the assist force applying device for applying assist force to the operating object operated when the user applies force. For example, the assist motor that changes the operation feeling of the acceleration pedal or the brake pedal of the automobile may be controlled.

(Configuration Example by Software)

Each block of the steering feeling setting unit 2 and the motor controlling unit 3 may be configured by hardware logic, or may be realized by software using the CPU as described below.

That is, the steering feeling setting unit 2 and the motor controlling unit 3 includes a CPU (Central Processing Unit) for executing the command of the control program for realizing each function, a ROM (Read Only Memory) for storing the program, a RAM (Random Access Memory) for expanding the program, a storage device (recording medium) such as a memory for storing the program and various data etc. One or more embodiments of the present invention may involve supplying the recording medium, on which the program code (executable format program, intermediate code program, source program) of the control program of the steering feeling setting unit 2 and the motor controlling unit 3 or the software for realizing the above described function is computer-readably recorded, to the steering feeling setting unit 2 and the motor controlling unit 3 and having the computer (or CPU or MPU) read and execute the program code recorded on the recording medium.

The recording medium used may be tapes such as magnetic tape and cassette tape, discs including magnetic discs such as floppy disc (registered trademark/hard disc and optical disc such as CD-ROM/MO/MD/DVD/CD-R, cards such as IC card (include memory card)/optical card, semiconductor memories such as mask ROM/EPROM/EEPROM/flash ROM.

The steering feeling setting unit 2 and the motor controlling unit 3 may be configured connectable to a communication network, and the program code may be supplied through the communication network. The communication network is not particularly limited, and the Internet, intranet, extranet, LAN, ISDN, VAN, CATV communication network, virtual private network, telephone line network, mobile communication network, satellite communication network, etc. may be used. The transmission medium configuring the communication network is not particularly limited, and wired medium such as IEEE1394, USB, power line carrier, cable TV line, telephone line, ADSL line, and wireless medium such as infrared line such as IrDA and remote controller, Bluetooth (registered trademark), 802.11 wireless, HDR, cellular phone network, satellite line, terrestrial digital network and the like may be used. One or more embodiments of the present invention can be realized in the form of computer data signal embedded in the carrier wave in which the program code is embodied in electronic transmission.

The present invention is not limited to each of the above embodiments, and various modifications within the scope of the claims are possible. That is, embodiments obtained by combining the technical means appropriately modified within the scope of the claims are also encompassed in the technical scope of the present invention.

One or more embodiments of the present invention is applicable to an operation system including an operating object device operated when the operation member moves according to the force applied from the user, and an assist force applying device for applying the assist force to the movement of the operation member. Such operation systems include an operation system for controlling the assist motor to apply the assist force to the steering device of the automobile, an operation system for controlling the assist motor to change the steering feeling of the acceleration pedal and the brake pedal of the automobile, and the like.

Therefore, the sensitivity identifying device according to one or more embodiments of the present invention has an advantage in that the operation feeling of the user can be accurately specified and outputted as the sensitivity index.

The assist force controlling device according to one or more embodiments of the present invention has an advantage in that application of the assist force accurately corresponding to the operation feeling felt by the user can be performed.

The assist force setting device according to one or more embodiments of the present invention has an advantage in that the assist force setting device can set the optimal assist force in view of both the sensitivity index and the operating condition.

What is claimed is:

1. A sensitivity identifying device comprising:
   an operating object device configured to operate when an operation member is moved according to a force applied by a user;
   an assist force applying device for applying an assist force to movement of the operation member;
   an operation force parameter detecting device for detecting a value of an operation force parameter, which indicates the force applied to the operation member by the user;
   an operation response parameter detecting device for detecting a value of an operation response parameter, which indicates the condition in which the assist force applying device is operated according to an operation by the user;
   a sensitivity identifying information storage section for storing sensitivity identifying information associating a sensitivity index, which specifies an operation feeling during operation of the operating object device, with a combination of the value of the operation force parameter and a value of an operation response parameter; and
   a sensitivity determining unit for specifying the sensitivity index based on the combination of the value of the operation force parameter and the value of the operation response parameter, and the sensitivity identifying information, and outputting the sensitivity index.

2. The sensitivity identifying device according to claim 1, wherein
   the operating object device is a steering device arranged in an automobile;
   the operation member is a steering wheel arranged in the steering device; and
   the assist force applying device is an assist motor for applying the assist force to the steering device with a rotation of the steering wheel.

3. The sensitivity identifying device according to claim 1, further comprising a plurality of operation force parameters and a plurality of operation response parameters, and at least one of each parameter is combined.

4. The sensitivity identifying device according to claim 1, wherein the sensitivity identifying information is a sensitivity identifying map in which a plurality of two dimensional maps, each having a sensitivity region corresponding to each sensitivity index set in a two dimensional space having the operation force parameter and the operation response parameter as axes, for each value of a specific operating condition parameter indicating an operating condition in the operating object device.

5. The sensitivity identifying device according to claim 4, wherein:
the operating object device is a steering device arranged in an automobile;
the operation member is a steering wheel arranged in the steering device;
the assist force applying device is an assist motor for applying the assist force to the steering device with a rotation of the steering wheel;
the operation force parameter corresponding to one axis of the two dimensional map is a torque value indicating the torque applied to the steering device with the rotation of the steering wheel;
the operation response parameter corresponding to another axis of the two dimensional map is a rotation number value of the assist motor; and
the two dimensional map is arranged for every vehicle speed value indicating a speed of the automobile.

6. An operation system comprising:
the sensitivity identifying device according to claim 1; and
an assist force controlling device for controlling the assist force applied by the assist force applying device, the assist force controlling device comprising:
an assist force setting information storage section for storing a correspondence relationship of the sensitivity index and assist force setting information for setting the magnitude of the assist force; and
an assist force controlling unit for reading from the assist force setting information storage section the assist force setting information corresponding to the sensitivity index received from the sensitivity identifying device, and controlling the assist force applying device based on the read assist force setting information.

7. The operation system according to claim 6, wherein
the assist force setting information is information indicating the relationship between a value of a specific operating condition parameter indicating the operating condition in the operating object device and the assist force; and
the assist force controlling unit transmits the assist force setting information to an assist force setting device for setting the assist force of the assist force applying device.

8. The operation system according to claim 6, wherein
the operating object device is a steering device arranged in an automobile;
the operation member is a steering wheel arranged in the steering device;
the assist force applying device is an assist motor for applying the assist force to the steering device with a rotation of the steering wheel; and
the assist force setting information is information indicating the relationship between the assist force and at least one of a torque value indicating the torque applied to the steering device, a rotation number value of the assist motor, and a vehicle speed value indicating the speed of the automobile with the rotation of the steering wheel.

9. The operation system according to claim 6, wherein
the assist force setting information is arranged for each type of a plurality of operation modes set in advance; and
the assist force controlling unit receives specifying information of the operation mode specified by the user from an operation mode setting device for accepting command input specifying the operation mode from the user, and controls the assist force applying device based on the assist force setting information corresponding to the received specifying information.

10. The operation system according to claim 7, further comprising:
an assist force setting device for receiving assist force setting information from the assist force controlling device and setting the assist force of the assist force applying device based on the assist force setting information, the assist force setting device comprising:
an assist force setting information storage section for storing the assist force setting information received from the assist force controlling device; and
an assist force setting unit for outputting an assist force set value for setting the assist force of the assist force applying device to the assist force applying device based on the value of at least one operating condition parameter received from an operating condition parameter detecting device for detecting the value of the specific operating condition parameter, and the assist force setting information.

11. The operation system according to claim 10, wherein the assist force setting unit changes an assist force set value from before change to after change over a time of longer than or equal to 100 msec from a start of change when changing the assist force set value.

12. A steering assist system for assisting operation of an operating object device, comprising:
a steering device configured to operate when a steering wheel is moved according to force applied by the user;
an assist motor for applying assist force to a movement of the steering wheel;
an operation force parameter detecting device for detecting a value of an operation force parameter which indices the force applied to the steering wheel by the user;
an operation response parameter detecting device for detecting a value of an operation response parameter which indicates the condition in which the assist motor is operated according to the operation by the user;
a sensitivity identifying information storage section for storing sensitivity identifying information associating a sensitivity index with a combination of the value of the operation force parameter and the value of the operation response parameter;
a sensitivity determining unit for specifying the sensitivity index based on the combination of the value of the operation force parameter detected by the operation force parameter detecting device and the value of the operation response parameter detected by the operation response parameter detecting device, and the sensitivity identifying information, and outputting the sensitivity index;
an assist force setting information storage section for storing a correspondence relationship of the sensitivity index and assist force setting information for setting the magnitude of the assist force;

an assist controlling unit for reading the assist force setting information corresponding to the sensitivity index specified by the sensitivity determining unit from the assist force setting information storage section, and controlling the assist motor based on the read assist force setting information; and an assist force setting unit for outputting an assist force set value for setting the assist force to the assist motor based on the value of at least one parameter of the operation force parameter or the operation response parameter and the assist force setting information.

13. A sensitivity identifying method for outputting a sensitivity index specifying an operation feeling during operating an operating object device by means of an operation member; the method comprising the steps of:

storing, in advance, sensitivity identifying information associating the sensitivity index with a combination of a value of an operation force parameter indicating a force applied to the operation member by a user and a value of an operation response parameter indicating a condition in which an assist force applying device is operated according to the operation by the user in a sensitivity identifying information storage section;

detecting the value of the operation force parameter indicating the force applied to the operation member by the user;

detecting the value of the operation response parameter indicating the condition in which the assist force applying device is operated according to the operation by the user;

reading the sensitivity index corresponding to the combination of the value of the detected operation force parameter and the value of the operation response parameter from the sensitivity identifying information storage section; and outputting the sensitivity index.

14. A sensitivity identifying program stored on a computer readable medium for outputting a sensitivity index specifying an operation feeling during operation of an operating object device by means of an operation member by an information processing device, the program comprising the steps of:

storing, in advance, sensitivity identifying information associating the sensitivity index with a combination of a value of an operation force parameter indicating the force applied to the operation member by the user and a value of an operation response parameter indicating a condition in which an assist force applying device is operated according to the operation by the user in a sensitivity identifying information storage section;

detecting the value of the operation force parameter indicating the force applied to the operation member from the user;

detecting the value of the operation response parameter indicating the condition in which the assist force applying device is operated according to the operation of the user;

reading the sensitivity index corresponding to the combination of the value of the detected operation force parameter and the value of the operation response parameter from the sensitivity identifying information storage section; and outputting the sensitivity index.

* * * * *